United States Patent Office 3,267,104
Patented August 16, 1966

3,267,104
1,4-DISUBSTITUTED PIPERAZINES AND DIAZEPINES
Hubert Karel Frans Hermans, Beerse, near Turnhout, and Wolfgang Karl-Adolf Schaper, Turnhout, Belgium, assignors to Janssen Pharmaceutica, N.V., a corporation of Belgium
No Drawing. Filed May 14, 1965, Ser. No. 455,973
16 Claims. (Cl. 260—268)

This invention is a continuation-in-part application of copending application Serial No. 373,840, filed June 9, 1964.

The invention relates to novel series of 1,4-disubstituted piperazine and diazepine derivatives and their therapeutically acceptable acid addition salts. The novel compounds herein may be represented by the following general formula:

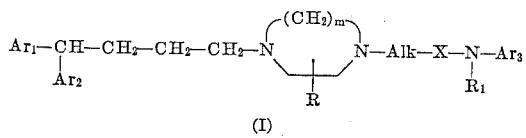

(I)

wherein $Ar_1$ and $Ar_2$ are each selected from the group consisting of phenyl; lower alkylphenyl, such as, for example, methylphenyl; halophenyl, such as, for example, fluorophenyl; trifluoromethylphenyl; and thienyl; $m$ is the integer 2 or 3; Alk is a member selected from the group consisting of $-CH(CH_3)-$ and $-(CH_2)_n-$ in which $n$ is the integer 1, 2 or 3; X represents carbonyl or methylene; R stands for hydrogen or methyl; $R_1$ stands for hydrogen, lower alkyl and lower alkyl carbonyl; and $Ar_3$ is a member selected from the group consisting of

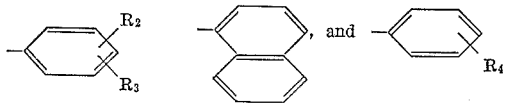

wherein $R_2$ and $R_3$ are each selected from the group consisting of hydrogen, lower alkyl, lower alkoxy, halo and nitro; and $R_4$ is lower alkyl carbonyl.

As used herein, lower alkyl and lower alkoxy have from 1 to 5 carbon atoms, including straight or branched saturated aliphatic chains, such as, for example, methyl, ethyl, propyl, isopropyl, butyl, isobutyl, tertiary-butyl, pentyl and the like, and, respectively, methoxy, ethoxy, propoxy, isopropoxy, etc.; and halo includes chloro, bromo, fluoro and iodo, preferably fluoro and chloro.

The compounds of the invention may be converted to their therapeutically acceptable acid addition salts by reaction with an appropriate acid as, for example, an inorganic acid such as a hydrohalic acid, i.e., hydrochloric, hydrobromic or hydroiodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, p-toluenesulfonic, salicylic, p-aminosalicylic, 2-phenoxybenzoic or 2-acetoxybenzoic acid.

The compounds of this invention may be prepared by reacting a compound of the general formula:

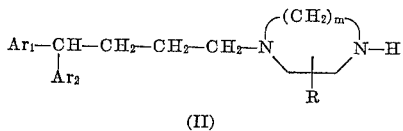

(II)

with a compound of the general formula:

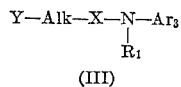

(III)

wherein $Ar_1$, $Ar_2$, $Ar_3$, $m$, X, Alk, R and $R_1$ are defined as above, and Y stands for a reactive ester of the corresponding alcohol with strong inorganic or organic acids such as hydrochloric, hydrobromic, hydroiodic, sulfuric, methanesulfonic and toluenesulfonic acid. Alternatively, a compound of the general formula:

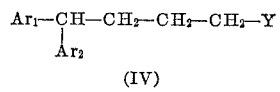

(IV)

may be reacted with a compound of the general formula:

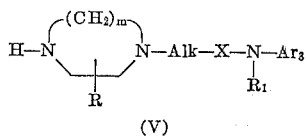

(V)

These reactions are carried out preferably by heating the reactants in the presence of a suitable inert organic solvent such as described hereinafter under reflux conditions.

Compounds of Formula II and Formula V may be obtained by reacting an anhydrous piperazine or perhydro-1,4-diazepine of the general Formula VI with, respectively, a compound of Formula IV and Formula III:

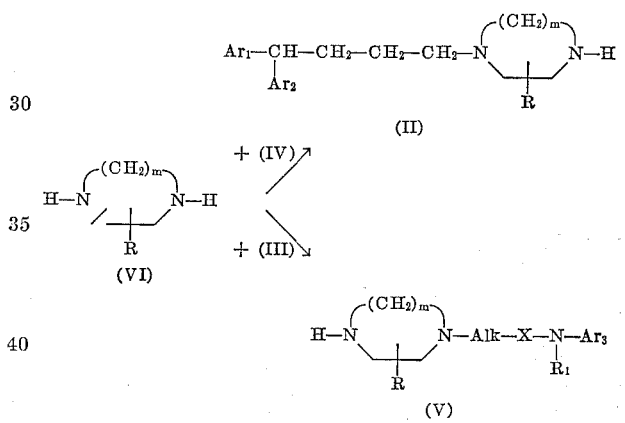

The compounds of Formula II and Formula V may also be advantageously prepared by reacting a compound of Formula VI, which bears a suitable blocking agent, such as a benzyl group, on one of its ring nitrogens, with, respectively, a compound of Formulas IV or III according to the above reaction schemes, and subsequently debenzylating the resulting compound. Such debenzylation is conveniently afforded by means of hydrogen activated by a suitable catalyst, for example, palladium-on-charcoal, in an alcoholic solvent such as ethanol. Such use is also preferred when $m$ of reactant VI equals 3, i.e., in preparation of the novel diazepine derivatives of this invention.

The compounds of the invention have antiangiotensine and antihistamine activity as determined on the isolated guinea pig ileum. In addition they have been shown to possess one or more of the following properties:

(1) Coronary vasodilation of long duration observable on oral, parenteral and intravenous administration of the drugs in dogs, especially when $Ar_1$ and/or $Ar_2$ in the above formula stand for fluorophenyl or phenyl, $m$ is 2 or 3, $n$ is preferably 1, R is hydrogen or methyl, $R_1$ is hydrogen, X is carbonyl and $Ar_3$ is 2,6-di-lower-alkylphenyl, 2,6-di-halophenyl, 2-alkyl-6-halophenyl, 2,5-di-lower-alkoxyphenyl, and acylated phenyl, i.e. where $R_4$ stands for acetyl, propionyl, butyryl, etc. Most of these compounds have been shown to possess also local anesthetic properties, especially with those compounds in which R and $R_1$ is hydrogen, $m$ equals 2, Alk is —CH(CH$_3$)—, X is carbonyl and Ar$_3$ is phenyl or substituted phenyl.

(2) Central nervous system stimulating properties, anticarrageenin activity and local anesthetic activity are shown in a preferred subgeneric class wherein, in the above formula, Ar$_1$ stands for fluorophenyl, alkylphenyl, phenyl or thienyl, Ar$_2$ is fluorophenyl or phenyl, $m$ is 2 or 3, $n$ is preferably 1, R is hydrogen or methyl, X is methylene, R$_1$ is hydrogen or lower alkyl and Ar$_3$ is phenyl, or substituted phenyl, e.g. halophenyl, alkylphenyl.

Alternatively, the subject compounds where X is methylene can be obtained by reacting a compound of Formula II:

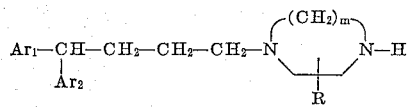

with a compound of the general formula:

$$Y\text{—}Alk\text{—}CH_2\text{—}Z$$

to yield a compound of the general structure:

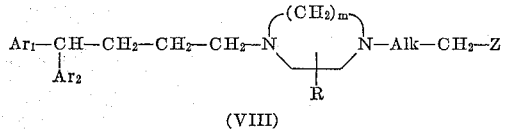

(VIII)

wherein Ar$_1$, Ar$_2$, $m$, Alk, R and Y are defined as above, and Z stands for hydroxy or Y. In case Z is hydroxy, this alcohol is transferred to a reactive ester Y with a strong inorganic or organic acid by conventional methods, whereafter compound VIII is reacted with a compound of the formula:

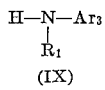

(IX)

wherein R$_1$ is hydrogen or lower alkyl, and Ar$_3$ is defined as above.

Acylation of the compounds of the general Formula I where R$_1$ is hydrogen, is accomplished by heating such compound with an acylating agent, such as, an anhydride of a lower fatty acid or a lower alkyl carbonyl halide under reflux conditions in the presence of a non-aqueous inert organic solvent.

Finally, compounds of the general Formula I where X is carbonyl and/or R$_1$ is lower alkyl carbonyl may be converted to their reduced counterparts, i.e., where X is methylene and/or R$_1$ is lower alkyl, by reaction with excess of a mixed metal hydride such as lithium aluminum hydride and the like, in a suitable inert organic solvent, such as tetrahydrofuran, dioxane or diethylether. Under such conditions, the carbonyl of R$_4$ is reduced to the corresponding carbinol. Reduction of the R$_4$ carbonyl group to a methylene group may be accomplished by amalgamated zinc and hydrochloric acid (Clemmensen reduction) or by alkaline decomposition of hydrazones, semicarbazones or azines (Wolff-Kishner reduction).

Depending upon the conditions employed during the course of the reaction, the novel compounds are obtained either in the form of the free bases or salts thereof. The salts are converted to the free bases in the usual manner, e.g., by reaction with alkali such as sodium or potassium hydroxide. The bases can be converted to their therapeutically useful acid addition salts by reaction with an appropriate organic or inorganic acid.

Organic solvents of advantage in conducting the necessary reactions of this invention include ketones, such as, acetone or 4-methyl-2-pentanone; aromatic and aliphatic hydrocarbons, such as, benzene, toluene, xylene or heptane; ethers, such as, tetrahydrofuran, dioxane or diethylether. Where appropriate, solvents such as lower alkanols may be used, e.g., ethanol, 2-propanol or butanol.

The following examples are intended to illustrate, but not to limit, the scope of the present invention.

*Example I*

A mixture of 143 parts of 1-chloro-4,4-diphenyl-butane, 309 parts piperazine and 800 parts 2-propanol is stirred and refluxed for 15 hours. After cooling the reaction mixture is washed with water. The organic layer is separated, dried over potassium carbonate, filtered and evaporated. The oily residue is distilled in vacuo, to yield 1-(4,4-diphenyl-butyl)-piperazine; B.P. 177–179° C. at 0.3 mm. pressure.

A mixture of 5.9 parts 1-(4,4-diphenyl-butyl)-piperazine, 6.2 parts N-(2-bromo-ethyl)-aniline hydrobromide, 8.5 parts sodium carbonate, a few crystals of potassium iodide and 160 parts 4-methyl-2-pentanone is stirred and refluxed for 48 hours. After cooling there are added 150 parts water. The organic layer is separated, dried over potassium carbonate and evaporated. The oily residue is dissolved in 420 parts diisopropylether. The solution is filtered several times until clear and gaseous hydrogen chloride is introduced into the filtrate. The precipitated salt is filtered off and recrystallized from a mixture of 160 parts 2-propanol and 120 parts denatured ethanol. After cooling overnight at room temperature, the solid is filtered off and dried in vacuo, yielding 1-(4,4-diphenyl-butyl)-4-(2-anilino-ethyl) - piperazine trihydrochloride; M.P. 227–229° C.

*Example II*

A mixture of 6.5 parts 1-(4,4-diphenyl-butyl)-piperazine, 4.4 parts N-methyl-N-(2-chloro-ethyl)-aniline, 7 parts sodium carbonate, a few crystals of potassium iodide in 200 parts 4-methyl-2-pentanone is stirred and refluxed for 2 days. After cooling there are added 250 parts water. The organic layer is separated, dried over potassium carbonate, filtered and evaporated. The oily residue is dissolved in anhydrous ether. Gaseous hydrogen chloride is introduced into this solution. The precipitated salt is filtered off and recrystallized twice: first from a mixture of 80 parts 2-propanol and 280 parts methanol and then from 200 parts methanol, yielding 1-(4,4-diphenyl-butyl)-4-[2-(N-methyl-anilino) - ethyl] - piperazine dihydrochloride; M.P. 260–263° C. (dec.).

*Example III*

A mixture of 5.9 parts 1-(4,4-diphenyl-butyl)-piperazine, 4.4 parts N-(2-chloro-acetyl)-2-methyl-aniline, 6.5 parts sodium carbonate, a few crystals of potassium iodide in 160 parts 4-methyl-2-pentanone is stirred and refluxed for 48 hours. After cooling there are added 150 parts water. The organic layer is separated, dried over magnesium sulfate and evaporated. The oily residue is dissolved in 480 parts anhydrous ether. The solution is filtered several times until clear and gaseous hydrogen chloride is introduced into the filtrate. The precipitated salt is filtered off and recrystallized from methanol, yielding 1-(4,4 - diphenyl-butyl)-4-[(2-methyl-anilino-carbonyl)-methyl]-piperazine dihydrochloride; M.P. 223.5–227° C.

*Example IV*

A mixture of 5.9 parts 1-(4,4-diphenyl-butyl)-piperazine, 4.7 parts N-(2-chloro-acetyl)-2,3-dimethyl-aniline, 6.5 parts sodium carbonate, a few crystals of potassium iodide in 160 parts 4-methyl-2-pentanone is stirred and refluxed for 48 hours. After cooling there are added 150 parts water. The organic layer is separated, dried over magnesium sulfate and evaporated. The oily residue is dissolved in 400 parts anhydrous ether. The solution is filtered several times until clear and there is added to the filtrate 2-propanol previously saturated with gaseous hydrogen chloride. The precipitated salt is filtered off and recrystallized from methanol, yielding 1-(4,4-diphenylbutyl) - 4 - [(2,3 - dimethyl - anilino-carbonyl) - methyl]-piperazine dihydrochloride; M.P. 226.5–229° C.

*Example V*

A mixture of 5.9 parts 1-(4,4-diphenyl-butyl)-piperazine, 4.7 parts N-(2-chloro-acetyl)-2,6-dimethyl-aniline, 6.5 parts sodium carbonate, a few crystals of potassium iodide in 160 parts 4-methyl-2-pentanone is stirred and refluxed for 48 hours. After the reaction mixture is cooled there are added 150 parts water. The organic layer is separated, dried over magnesium sulfate and evaporated. The oily residue is dissolved in 400 parts anhydrous ether. The obtained solution is filtered several times until clear and gaseous hydrogen chloride is introduced into the filtrate. The precipitated salt is filtered off and recrystallized from a mixture of methanol and anhydrous ether, yielding 1-(4,4-diphenyl-butyl)-4-[(2,6-dimethyl-anilino-carbonyl)-methyl] - piperazine dihydrochloride; M.P. 247–250° C.

*Example VI*

A mixture of 5.9 parts 1-(4,4-diphenyl-butyl)-piperazine, 5.4 parts N-(2-chloro-acetyl)-2,6-diethyl-aniline, 6.5 parts sodium carbonate, a few crystals of potassium iodide in 160 parts 4-methyl-2-pentanone is stirred and refluxed for 48 hours. After cooling there are added 150 parts water. The organic layer is separated, dried over magnesium sulfate, and evaporated. The oily residue is dissolved in 400 parts anhydrous ether. The solution is filtered several times until clear and gaseous hydrogen chloride is introduced into the filtrate. The precipitated salt is filtered off and recrystallized from a mixture of methanol and anhydrous ether, to yield 1-(4,4-diphenyl-butyl) - 4 - [(2,6-diethyl-anilino-carbonyl)-methyl]-piperazine dihydrochloride; M.P. 151–155° C.

*Example VII*

A mixture of 5.9 parts 1-(4,4-diphenyl-butyl)-piperazine, 5.5 parts N-(2-chloro-acetyl)-2,5-dimethoxy-aniline, 6.5 parts sodium carbonate, a few crystals of potassium iodide in 160 parts 4-methyl-2-pentanone is stirred and refluxed for 48 hours. After cooling there are added 150 parts water. The organic layer is separated, dried over magnesium sulfate and evaporated. The solid residue is recrystallized from a mixture of 4-methyl-2-pentanone and diisopropylether, yielding 1-(4,4-diphenyl-butyl) - 4 - [(2,5 - dimethoxy-anilino-carbonyl)-methyl]-piperazine; M.P. 100–101° C.

*Example VIII*

A mixture of 5.9 parts 1-(4,4-diphenyl-butyl)-piperazine, 5.3 parts N-(2-chloro-acetyl)-1-naphthylamine, 6.5 parts sodium carbonate, a few crystals of potassium iodide in 160 parts 4-methyl-2-pentanone is stirred and refluxed for 48 hours. After cooling there are added 150 parts water. The organic layer is separated, dried over magnesium carbonate and evaporated. The solid residue is recrystallized from 4-methyl-2-pentanone, yielding 1-(4,4-diphenyl-butyl-4-[(1-naphthylamino-carbonyl) - methyl]-piperazine; M.P. 160.5–162.5° C.

*Example IX*

To a stirred mixture of 172 parts piperazine in 560 parts 2-propanol is added portionwise a solution of 91.5 parts dl-1-chloro-4-phenyl-4-(4-fluoro-phenyl)-butane in 80 parts 2-propanol, at room temperature. After the addition is complete, the whole is stirred and refluxed for 8 hours. After cooling the reaction mixture is filtered and evaporated in vacuo. The residue is dissolved in 500 parts water. This solution is alkalized with sodium hydroxide solution and extracted with chloroform. The organic layer is washed three times with water (total volume: 500 parts), dried over potassium carbonate, filtered and evaporated. The oily residue is distilled in vacuo, yielding dl-1-[4-phenyl-4-(4-fluoro-phenyl)-butyl]-piperazine; B.P. 174–180° C. at 0.2 mm. pressure.

A mixture of 6.3 parts dl-1-[4-phenyl-4-(4-fluoro-phenyl)-butyl]-piperazine, 6.2 parts N-(2-bromo-ethyl)-aniline hydrobromide, 8.5 parts sodium carbonate, a few crystals of potassium iodide in 160 parts 4-methyl-2-pentanone is stirred and refluxed for 48 hours. After cooling there are added 150 parts water. The organic layer is separated, dried over potassium carbonate and evaporated. The oily residue is dissolved in 420 parts diisopropylether. The solution is filtered several times until clear and gaseous hydrogen chloride is introduced into the filtrate. The precipitated hydrochloride is filtered off and recrystallized from a mixture of 200 parts 2-propanol and 56 parts ethanol. After cooling to room temperature, the crystals are filtered off and dried in vacuo, yielding dl-1-[4-phenyl-4-(4-fluoro-phenyl)-butyl]-4-(2-anilino-ethyl) - piperazine trihydrochloride; M.P. 229–230° C.

*Example X*

A mixture of 6.2 parts dl-1-[4-phenyl-4-(4-fluoro-phenyl)-butyl]-piperazine, 3.8 parts N-methyl-N-(2-chloro-ethyl)-aniline, 3.2 parts sodium carbonate, a few crystals of potassium iodide in 200 parts 4-methyl-2-pentanone is stirred and refluxed for 65 hours. After cooling there are added 50 parts water. The organic layer is separated, dried, filtered and evaporated. The residue is dissolved in 600 parts diisopropylether. The obtained solution is filtered and gaseous hydrogen chloride is introduced into the filtrate. The precipitated salt is filtered off and recrystallized from 200 parts 2-propanol, yielding dl-1-[4-phenyl - 4 - (4 - fluoro-phenyl)-butyl] - 4 - [2-(N-methylanilino)-ethyl]-piperazine dihydrochloride; M.P. 253–256° C.

*Example XI*

A mixture of 6.2 parts dl-1-[4-phenyl-4-(4-fluoro-phenyl)-butyl]-piperazine, 5.2 parts N-(2-chloro-acetyl)-2,6-dichloro-aniline, 3.18 parts sodium carbonate, a few crystals of potassium iodide in 200 parts 4-methyl-2-pentanone is stirred and refluxed for 70 hours. After cooling there are added 100 parts water. The organic layer is separated, dried over potassium carbonate, filtered and evaporated. The oily residue is dissolved in diethylether. The solution is filtered and gaseous hydrogen chloride is introduced into the filtrate. The precipitated salt is filtered off and recrystallized from a mixture of methanol and ether, yielding dl-1-[4-phenyl-4-(4-fluoro-phenyl) - butyl] - 4 - [(2,6 - dichloro-anilino-carbonyl)-methyl]-piperazine dihydrochloride; M.P. 232–233.5° C.

*Example XII*

A mixture of 6.2 parts dl-1-1[4-phenyl-4-(4-fluoro-phenyl)-butyl]-piperazine, 4 parts N-(2-chloro-acetyl)-2-methyl-aniline, 3.18 parts sodium carbonate, a few crystals of potassium iodide in 200 parts 4-methyl-2-pentanone is stirred and refluxed for 70 hours. After cooling there are added 80 parts water. The organic layer is separated, dried over potassium carbonate, filtered and evaporated. The oily residue is dissolved in anhydrous ether. The solution is filtered and gaseous hydrogen chloride is introduced into the filtrate. The precipitated salt is filtered off and recrystallized from a mixture of 160 parts 2-propanol and 240 parts methanol, yielding dl-1-[4-phenyl-4-(4-fluoro-phenyl)-butyl]-4-[(2-methyl - anilino-carbonyl)-methyl]-piperazine dihydrochloride; M.P. 218–224° C.

*Example XIII*

A mixture of 6.2 parts dl-1-[4-phenyl-4-(4-fluoro-phenyl)-butyl]-piperazine, 4.4 parts N-(2-chloro-acetyl)-2,3-dimethyl-aniline, 3.2 parts potassium carbonate, a few crystals of potassium iodide in 200 parts 4-methyl-2-pentanone is stirred and refluxed for 70 hours. After cooling there are added 70 parts water. The organic layer is separated, dried over potassium carbonate, filtered and evaporated. The oily residue is dissolved in 400 parts anhydrous ether. The solution is filtered and gaseous hydrogen chloride is introduced into the filtrate. The precipitated salt is filtered off and recrystallized from 320 parts methanol, yielding dl-1-[4-phenyl-4-(4-fluorophenyl) - butyl] - 4 - [(2,3 - dimethyl-anilino-carbonyl)-methyl]-piperazine dihydrochloride; M.P. 239–242° C. (dec.).

Example XIV

A mixture of 6.2 parts dl-1-[4-phenyl-4-(4-fluorophenyl)-butyl]-piperazine, 4.3 parts N-(2-chloro-acetyl)-2,5-dimethyl-aniline, 3.18 parts sodium carbonate, a few crystals of potassium iodide in 200 parts 4-methyl-2-pentanone is stirred and refluxed for 70 hours. After cooling there are added 100 parts water. The organic layer is separated, dried over potassium carbonate, filtered and evaporated. The oily residue is dissolved in diethyl-ether. This solution is filtered and gaseous hydrogen chloride is introduced into the filtrate. The precipitated salt is filtered off and recrystallized from a mixture of methanol and ether, yielding dl-1-[4-phenyl-4-(4-fluorophenyl) - butyl] - 4 - [(2,5 - dimethyl-anilino-carbonyl)-methyl] - piperazine dihydrochloride; M.P. 246.5–247.5° C.

Example XV

A mixture of 6.3 parts dl-1-[4-phenyl-4-(4-fluorophenyl)-butyl]-piperazine, 4.33 parts N-(2-chloro-acetyl)-2,6-dimethyl-aniline, 3.2 parts sodium carbonate, a few crystals of potassium iodide in 200 parts 4-methyl-2-pentanone is stirred and refluxed for 45 hours. After cooling the formed precipitate is filtered off. It is washed with water and extracted with chloroform. The chloroform is dried over sodium sulfate, filtered and evaporated. The oily residue is dissolved in 40 parts diisopropylether and the solution is filtered. After keeping the filtrate at room temperature, the formed precipitate is filtered off and dried, yielding dl-1-[4-phenyl-4-(4-fluoro-phenyl)-butyl]-4-[(2,6-dimethyl-anilino-carbonyl)-methyl]-piperazine; M.P. 139.5–141° C.

Example XVI

A mixture of 6.2 parts dl-1-[4-phenyl-4-(4-fluorophenyl)-butyl]-piperazine, 5 parts N-(2-chloro-acetyl)-2,6-diethyl-aniline, 3.2 parts sodium carbonate, a few crystals of potassium iodide in 200 parts 4-methyl-2-pentanone is stirred and refluxed for 70 hours. After cooling there are added 70 parts water. The organic layer is separated, dried over potassium carbonate, filtered and evaporated. The oily residue is dissolved in 400 parts anhydrous ether. The solution is filtered and gaseous hydrogen chloride is introduced into the filtrate. The precipitated salt is filtered off and recrystallized from a mixture of 40 parts 2-propanol and 40 parts anhydrous ether, yielding dl-1-[4-phenyl-4-(4-fluoro-phenyl)-butyl]-4-[(2,6-diethyl-anilino-carbonyl)-methyl]-piperazine dihydrochloride; M.P. 235.5–238° C.

Example XVII

A mixture of 6.2 parts dl-1-[4-phenyl-4-(4-fluorophenyl)-butyl]-piperazine, 5 parts N-(2-chloro-acetyl)-2,5-dimethoxy-aniline, 3.2 parts sodium carbonate, a few crystals of potassium iodide in 200 parts 4-methyl-2-pentanone is stirred and refluxed for 70 hours. After cooling there are added 70 parts water. The organic layer is separated, dried over potassium carbonate, filtered and evaporated. The oily residue is dissolved in 400 parts anhydrous ether. The solution is filtered and gaseous hydrogen chloride is introduced into the filtrate. The precipitated salt is filtered off and recrystallized from a mixture of 40 parts methanol and 120 parts anhydrous ether, yielding dl-1-[4-phenyl-4-(4-fluoro-phenyl)butyl]-4-[(2,5-dimethoxy-anilino-carbonyl)-methyl] - piperazine dihydrochloride; M.P. 189.5–192° C.

Example XVIII

A mixture of 6.2 parts dl-1-[4-phenyl-4-(4-fluorophenyl)-butyl]-piperazine, 5.7 parts N-(2-chloro-acetyl)-2,4-dinitro-aniline, 3.2 parts sodium carbonate, a few crystals of potassium iodide in 200 parts 4-methyl-2-pentanone is stirred and refluxed for 45 hours. After cooling the reaction mixture is washed with 100 parts diluted hydrochloric acid. The formed precipitate is filtered off and recrystallized from a mixture of 160 parts methanol and 5 parts water, yielding a mixture of the mono- and dihydrochloride salt of the condensation product. This fraction is triturated in water. The aqueous suspension is alkalized with sodium hydroxide solution and extracted with chloroform. The extract is dried over sodium sulfate, filtered and evaporated. The oily residue solidifies in 80 parts methanol while scratching. It is filtered off and dried, yielding dl-1-[4-phenyl-4 - (4 - fluoro-phenyl)-butyl]-4-[(2,4-dinitro-anilino-carbonyl)-methyl]-piperazine; M.P. 129–131° C.

Example XIX

A mixture of 6.2 parts dl-1-[4-phenyl-4-(4-fluoro-phenyl) - butyl] - piperazine, 4.8 parts N-(2-chloro-acetyl)-1-naphthylamine, 3.2 parts sodium carbonate, a few crystals of potassium iodide in 200 parts 4-methyl-2-pentanone is stirred and refluxed for 40 hours. After cooling there are added 70 parts water. The organic layer is separated, dried over potassium carbonate, filtered and evaporated. The oily residue is dissolved in 400 parts anhydrous ether. The solution is filtered and gaseous hydrogen chloride is introduced into the filtrate. The precipitated salt is filtered off and recrystallized from a mixture of 80 parts 2-propanol and 80 parts methanol. The solid is filtered off and dried, yielding a first fraction of dl - 1 - [4-phenyl-4-(4-fluoro-phenyl)-butyl]-4-[(1-naphthylamino-carbonyl)-methyl]-piperazine dihydrochloride; M.P. 230° C. (dec.).

The mother liquor is diluted with ether until a turbid solution is obtained. After keeping at room temperature for a few hours, the formed precipitate is filtered off and dried, yielding a second pure fraction of dl-1-[4-phenyl-4-(4 - fluoro - phenyl)-butyl]-4-[(1-naphthylamino-carbonyl)-methyl]-piperazine dihydrochloride; M.P. 217.5–223° C. (dec.).

Example XX

A mixture of 18.6 parts dl-1-[4-phenyl-4-(4-fluorophenyl)-butyl]-piperazine, 12.1 parts N-(3-chloro-propionyl)-aniline, 9.6 parts sodium carbonate, a few crystals of potassium iodide in 400 parts 4-methyl-2-pentanone is stirred and refluxed for 48 hours. After cooling there are added 50 parts water. The organic layer is separated, dried over potassium carbonate, filtered and evaporated. The residue is dissolved in 800 parts diisopropylether. The solution is filtered and gaseous hydrogen chloride is introduced into the filtrate. The solid salt is filtered off and recrystallized from 380 parts methanol, yielding dl-1-[4 - phenyl - 4-(4-fluoro-phenyl)-butyl]-4-[2-(anilino-carbonyl)-ethyl]-piperazine dihydrochloride; M.P. 227.5–232.5° C.

Example XXI

To a solution of 232 parts piperazine in 640 parts 2-propanol is added dropwise a solution of 125 parts 1-chloro-4,4-di-(4-fluoro-phenyl)-butane in 180 parts benzene. After the addition is complete, the whole is stirred and refluxed for 3 hours. After cooling the insoluble matter is filtered off and the filtrate is evaporated. The residue is dissolved in water. This solution is alkalized with sodium hydroxide and extracted with chloroform. The extract is washed with water, dried over potassium carbonate and evaporated. The residue is distilled in vacuo, yielding 1 - [4,4 - di-(4-fluoro-phenyl)-butyl]-piperazine; B.P. 192–193° C. at 0.5 mm. pressure.

A mixture of 6 parts 1-[4,4-di-(4-fluoro-phenyl)-butyl]-piperazine, 5.7 parts 1-bromo-2-anilino-ethane hydrobromide, 8.5 parts sodium carbonate, a few crystals of potassium iodide in 200 parts 4-methyl-2-pentanone is stirred and refluxed for 48 hours. After cooling there are added 100 parts water. The organic layer is separated, dried over potassium carbonate, filtered and evaporated. The oily residue is dissolved in diisopropylether and gaseous hydrochloride is introduced into the solution. The precipitated salt is filtered off and recrystallized from a mixture of 120 parts 2-propanol and 60 parts methanol, yielding 1 - [4,4-di-(4-fluoro-phenyl)-butyl]-4-(2-anilino-ethyl)-piperazine trihydrochloride; M.P. 218–222° C.

Example XXII

A mixture of 6 parts 1-[4,4-di-(4-fluoro-phenyl)-butyl]-piperazine, 6 parts N-(2-bromo-ethyl)-2-methyl-aniline, 8.5 parts sodium carbonate, a few crystals of potassium iodide in 200 parts 4-methyl-2-pentanone is stirred and refluxed for 60 hours. After cooling there are added 100 parts water. The organic layer is separated, dried over potassium carbonate and evaporated. The oily residue is dissolved in diisopropylether. The solution is filtered and gaseous hydrogen chloride is introduced into the filtrate. The precipitated salt is filtered off and recrystallized from 80 parts methanol, yielding a first crude fraction of 1-[4,4-di-(4-fluoro-phenyl)-butyl]-4-[2-(2-methyl-anilino)-ethyl]-piperazine trihydrochloride hydrate. After standing the mother liquor for a few hours at room temperature, a second crude fraction of 1-[4,4-di-(4-fluoro-phenyl) - butyl]-4-[2-(2-methyl-anilino)-ethyl]-piperazine trihydrochloride hydrate is obtained.

The combined crude fractions are recrystallized once more from 80 parts methanol, yielding pure 1-[4,4-di-(4-fluoro - phenyl)-butyl]-4-[2-(2-methyl-anilino)-ethyl]-piperazine trihydrochloride hydrate; M.P. 236–238.5° C.

Example XXIII

A mixture of 6 parts 1-[4,4-di-(4-fluoro-phenyl)-butyl]-piperazine, 7.2 parts N-(2-bromo-ethyl)-3-methyl-aniline, 8.5 parts sodium carbonate, a few crystals of potassium iodide in 200 parts 4-methyl-2-pentanone is stirred and refluxed for 48 hours. After cooling there are added 100 parts water. The organic layer is separated, dried over potassium carbonate, filtered and evaporated. The oily residue is dissolved in a mixture of 105 parts diisopropylether and 16 parts 4-methyl-2-pentanone. The obtained solution is saturated with gaseous hydrogen chloride. The precipitated salt is filtered off and recrystallized from 80 parts 2-propanol, yielding 1-[4,4-di-(4-fluoro-phenyl)-butyl]-4-[2-(3-methyl-anilino)-ethyl]-piperazine trihydrochloride; M.P. 206–210.5° C.

Example XXIV

A mixture of 6 parts 1-[4,4-di-(4-fluoro-phenyl)-butyl]-piperazine, 6 parts N-(2-bromo-ethyl)-4-methyl-aniline hydrobromide, 8.5 parts sodium carbonate, a few crystals of potassium iodide in 200 parts 4-methyl-2-pentanone is stirred and refluxed for 60 hours. After cooling there are added 100 parts water. The organic layer is separated, dried over potassium carbonate, and evaporated. The oily residue is dissolved in diisopropylether and gaseous hydrogen chloride is introduced into the solution. The precipitated salt is filtered off and recrystallized from 60 parts methanol, yielding 1-[4,4-di-(4-fluoro-phenyl)-butyl] - 4-[2-(4-methyl-anilino)-ethyl]-piperazine trihydrochloride, M.P. 223–231° C.

Example XXV

To a warm mixture of 121 parts 2,6-dimethyl-aniline in 600 parts ethanol (40° C.) is added dropwise a solution of 55 parts ethyleneoxide in 400 parts ethanol, while stirring. After the addition is complete, the whole is stirred overnight at room temperature. The mixture is stirred and refluxed for 5 hours and then evaporated. The oily residue is distilled in vacuo, yielding N-(2-hydroxy-ethyl)-2,6-dimethyl-aniline; B.P. 100–125° C. at 0.15 mm. pressure.

A mixture of 43 parts N-(2-hydroxy-ethyl)-2,6-dimethyl-aniline and 225 parts of hydrobromic acid solution 48% is boiled while stirring at about 140° C. in an oil-bath in a flask provided with a reflux-condenser fitted for distillation. After 3 hours a second portion of 150 parts of hydrobromic acid solution 48% is added and the temperature is adjusted so that after 15 hours all of the water is distilled (temperature: 130° C.). Then a third portion of 150 parts of hydrobromic acid solution 48% is added and the temperature of the oil-bath is adjusted so that after 3 hours all of the water is distilled (temperature: about 160° C.). The solid residue is boiled in 160 parts ethanol, filtered off again while hot, washed with 2-propanol and dried, yielding N-(2-bromo-ethyl)-2,6-dimethyl-aniline hydrobromide; M.P. 230–237° C.

A mixture of 6.6 parts 1-[4,4-di-(4-fluoro-phenyl)-butyl]-piperazine, 6.8 parts N-(2-bromo-ethyl)-2,6-dimethyl-aniline hydrobromide, 6.4 parts sodium carbonate, a few crystals of potassium iodide in 200 parts 4-methyl-2-pentanone is stirred and refluxed for 70 hours. After cooling there are added 70 parts water. The organic layer is separated, dried over magnesium sulfate, filtered and evaporated. The oily residue is dissolved in 320 parts anhydrous diisopropylether. This solution is filtered and gaseous hydrogen chloride is introduced into the filtrate. The solid salt is filtered off and triturated in 160 parts methanol, whereafter gaseous hydrogen chloride is introduced into it. The mixture is boiled and a second portion of methanol is added until a clear solution is obtained. Then there are added activated charcoal and the whole is boiled for a few minutes. The solution is filtered hot and after cooling the filtrate to room temperature, the solid salt is filtered off and dried, yielding after recrystallization from 80 parts methanol, 1-[4,4-di-(4-fluoro-phenyl) - butyl]-4-[2,(2,6-dimethyl-anilino)-ethyl]-piperazine trihydrochloride; M.P. 240–241° C.

Example XXVI

An aqueous solution of 8.3 parts N-(2-bromo-ethyl)-1-naphthylamine hydrobromide is alkalized with ammonium hydroxide solution and extracted several times with 80 parts xylene. The solvent is dried over anhydrous magnesium sulfate. There is added 16.5 parts 1-[4,4-di-(4-fluoro-phenyl)-butyl]-piperazine and the whole is stirred and refluxed for 24 hours. After cooling the reaction mixture, the precipitated solid is filtered off (mainly the hydrobromide salt of the starting material). The filtrate is evaporated. The oily residue is washed with water and extracted several times with ether. The combined extracts are dried over potassium carbonate, filtered and gaseous hydrogen chloride is introduced into the filtrate. The precipitated salt is filtered off and recrystallized from 2-propanol, yielding 1-[4,4-di-(4-fluoro-phenyl)-butyl]-4-[2 - (1-naphthylamino)-ethyl]-piperazine dihydrochloride; M.P. 215–219° C.

Example XXVII

A mixture of 7 parts 1-[4,4-di-(4-fluoro-phenyl)-butyl]-piperazine, 3.8 parts N-methyl-N-(2-chloro-ethyl)aniline, 3.18 parts sodium carbonate, a few crystals of potassium iodide in 200 parts 4-methyl-2-pentanone is stirred and refluxed for 70 hours. After cooling there are added 80 parts water. The organic layer is separated, dried over potassium carbonate, filtered and evaporated. The oily residue is dissolved in 420 parts anhydrous diisopropylether. The solution is filtered and gaseous hydrogen chloride is introduced into the filtrate. The precipitated salt is filtered off and recrystallized from a mixture of 80 parts 2-propanol and 40 parts methanol, yielding 1-[4,4-di - (4 - fluoro-phenyl)-butyl]-4-[2-(N-methyl-anilino)-ethyl]-piperazine dihydrochloride; M.P. 241–243° C. (dec.).

Example XXVIII

A mixture of 6 parts 1-[4,4-di-(4-fluoro-phenyl)-butyl]-piperazine 3.4 parts N-(2-chloro-acetyl)-aniline, 6.5 parts sodium carbonate, a few crystals of potassium iodide in 200 parts 4-methyl-2-pentanone is stirred and refluxed for 48 hours. After cooling there are added 100 parts water.

The organic layer is separated, dried over potassium carbonate and evaporated. The oily residue is dissolved in diisopropylether and gaseous hydrogen chloride is introduced into the solution. The precipitated salt is filtered off and recrystallized from methanol, yielding 1-[4,4-di-(4 - fluoro-phenyl)-butyl]-4-[(anilino-carbonyl)-methyl]-piperazine dihydrochloride; M.P. 240–251° C. (dec.).

*Example XXIX*

A mixture of 6.9 parts 1-[4,4-di-(4-fluoro-phenyl) butyl]-piperazine 5.2 parts N-(2-chloro-acetyl)-2,6-dichloro-aniline, 3.18 parts sodium carbonate a few crystals of potassium iodide in 200 parts 4-methyl-2-pentanone is stirred and refluxed for 70 hours. After cooling there are added 100 parts water. The organic layer is separated, dried over potassium carbonate, filtered and evaporated. The oily residue is dissolved in a mixture of 400 parts ether and 40 parts acetone. The solution is filtered and gaseous hydrogen chloride is introduced into the filtrate: an oil is precipitated. The solvent is decanted and the oily residue solidifies on scratching in 2-propanol. This solid is filtered off and recrystallized from a mixture of 240 parts 2-propanol and 240 parts methanol, yielding 1-[4,4-di - (4-fluoro-phenyl)-butyl]-4-[(2,6-dichloro-anilino-carbonyl)-methyl]-piperazine dihydrochloride; M.P. 239–243° C.

*Example XXX*

A mixture of 6.6 parts 1-[4,4-di-(4-fluoro-phenyl)-butyl]-piperazine, 4 parts N-(2-chloro-acetyl)-2-methyl-aniline, 3.2 parts sodium carbonate, a few crystals potassium iodide in 200 parts 4-methyl-2-pentanone is stirred and refluxed for 40 hours. After cooling there are added 70 parts water. The organic layer is separated, dried over potassium carbonate, filtered and evaporated. The oily residue is dissolved in 400 parts anhydrous ether. The solution is filtered and gaseous hydrogen chloride is introduced into the filtrate. The precipitated salt is filtered off and recrystallized from a mixture of 2-propanol and methanol, yielding 1-[4,4-di-(4-fluoro-phenyl)-butyl]-4-[(2-methyl-anilino - carbonyl)-methyl]-piperazine dihydrochloride; M.P. 234.5–238.5° C.

*Example XXXI*

A mixture of 6.6 parts 1-[4,4-di-(4-fluoro-phenyl)-butyl]-piperazine, 4.4 parts N-(2-chloro-acetyl)-2,3-dimethyl-aniline, 3.2 parts sodium carbonate, a few crystals of potassium iodide in 200 parts 4-methyl-2-pentanone is stirred and refluxed for 70 hours. After cooling there are added 70 parts water. The organic layer is separated, dried over potassium carbonate, filtered and evaporated. The oily residue is dissolved in 400 parts anhydrous ether. The solution is filtered and gaseous hydrogen chloride is introduced into the filtrate. The precipitated salt is filtered off and recrystallized from methanol, yielding 1-[4,4 - di - (4-fluoro-phenyl)-butyl]-4-[(2,3-dimethyl-anilino - carbonyl) - methyl]-piperazine dihydrochloride; M.P. 241–242° C. (dec.).

*Example XXXII*

A mixture of 6.9 parts 1-[4,4-di-(4-fluoro-phenyl)-butyl]-piperazine, 4.3 parts N-(2-chloro-acetyl)-2,5-dimethyl-aniline, 3.18 parts sodium carbonate, a few crystals potassium iodide in 200 parts 4-methyl-2-pentanone is stirred and refluxed for 70 hours. After cooling there are added 100 parts water. The organic layer is separated, dried over potassium carbonate, filtered and evaporated. The oily residue is dissolved in ether. This solution is filtered and gaseous hydrogen chloride is introduced into the filtrate. The precipitated salt is filtered off and recrystallized from a mixture of methanol and ether, yielding 1-[4,4-di-(4-fluoro-phenyl)-butyl] - 4 - [(2,5-dimethyl-anilino - carbonyl) - methyl] - piperazine dihydrochloride; M.P. 241–244° C.

*Example XXXIII*

A mixture of 6.6 parts 1-[4,4-di-(4-fluoro-phenyl)-butyl]-piperazine, 4.33 parts N-(2-chloro-acetyl)-2,6-dimethyl-aniline, 3.2 parts sodium carbonate, a few crystals of potassium iodide in 200 parts 4-methyl-2-pentanone is stirred and refluxed for 70 hours. After cooling there are added 70 parts water. The organic layer is separated, dried over potassium carbonate, filtered and evaporated. The oily residue is dissolved in 80 parts diisopropyl-ether and the solution is filtered hot. After cooling the filtrate at 0° C., the formed solid is filtered off and recrystallized from 80 parts ether, yielding 1-[4,4-di-(4-fluoro-phenyl)-butyl]-4-[(2,6-dimethyl-anilino-carbonyl)-methyl]-piperazine; M.P. 159–161° C.

*Example XXXIV*

A mixture of 6.6 parts 1-[4,4-di-(4-fluoro-phenyl)-butyl]-piperazine, 5 parts N-(2-chloro-acetyl)-2,6-diethyl-aniline, 3.2 parts sodium carbonate, a few crystals of potassium iodide in 200 parts 4-methyl-2-pentanone is stirred and refluxed for 70 hours. After cooling the reaction mixture is washed with a sodium hydroxide solution. The organic layer is separated, dried over potassium carbonate, filtered and evaporated. The oily residue is dissolved in 40 parts diisopropylether. The solution is filtered hot and after cooling the filtrate to room temperature, the formed precipitate is filtered off and dried, yielding 1-[4,4-di-(4-fluoro-phenyl) - butyl] - 4 - [(2,6-diethyl-anilino-carbonyl)-methyl]-piperazine; M.P. 104–105° C.

*Example XXXV*

A mixture of 6.6 parts 1-[4,4-di-(4-fluoro-phenyl)-butyl]-piperazine, 5 parts N-(2-chloro-acetyl)-2,5-dimethoxy-aniline, 3.2 parts sodium carbonate, a few crystals of potassium iodide in 200 parts 4-methyl-2-pentanone is stirred and refluxed for 70 hours. After cooling there are added 70 parts water. The organic layer is separated, dried over potassium carbonate, filtered and evaporated. The oily residue is dissolved in 400 parts anhydrous ether. The solution is filtered and gaseous hydrogen chloride is introduced into the filtrate. The precipitated salt is filtered off and recrystallized from a mixture of 40 parts methanol and 160 parts anhydrous ether, yielding 1-[4,4-di-(4-fluoro-phenyl)-butyl]-4-[(2,5 - dimethoxy-anilino-carbonyl)-methyl]-piperazine dihydro chloride; M.P. 187.5–196° C. (dec.).

*Example XXXVI*

A mixture of 6.6 parts 1-[4,4-di-(4-fluoro-phenyl)-butyl]-piperazine, 4.8 parts N-(2-chloro-acetyl)-1-naphthylamine, 3.2 parts sodium carbonate, a few crystals of potassium iodide in 200 parts 4-methyl-2-pentanone is stirred and refluxed for 40 hours. After cooling there are added 50 parts water. The organic layer is separated, dried over potassium carbonate, filtered and evaporated. The oily residue is dissolved in 400 parts diethylether and 120 parts acetone. The solution is filtered and gaseous hydrogen chloride is introduced into the filtrate. The precipitated salt is filtered off and recrystallized from a mixture of 400 parts methanol and 20 parts water, yielding 1-[4,4-di-(4-fluoro-phenyl) - butyl]-4-[(1-naphthylamino-carbonyl)-methyl]-piperazine dihydrochloride; M.P. 223–237° C. (dec.).

*Example XXXVII*

A mixture of 10 parts 1-[4,4-di-(4-fluoro-phenyl)-butyl]-piperazine, 6 parts N-(3-chloro-propionyl)-aniline, 9.5 parts sodium carbonate, a few crystals potassium iodide in 200 parts 4-methyl-2-pentanone is stirred and refluxed for 48 hours. After cooling there are added 100 parts water. The organic layer is separated, dried over potassium carbonate, and evaporated. The oily residue is dissolved in diisopropylether and gaseous hydrogen chloride is introduced into this solution. The precipitated salt is filtered off and recrystalized from 80 parts 2-propanol, yielding 1-[4,4-di-(4-fluoro-phenyl)-butyl]4-[2-(anilino-carbonyl)-ethyl]piperazine dihydrochloride; M.P. 218.5–219.5° C.

Example XXXVIII

A mixture of 94 parts 4-chloro-1,1-di-(4-methyl-phenyl)-1-butene and 240 parts 2-propanol is hydrogenated at normal pressure and at a temperature of about 35° C. in the presence of 15 parts palladium-on-charcoal catalyst 10%. After the calculated amount of hydrogen is taken up, hydrogenation is stopped. The catalyst is filtered off and after cooling the filtrate to −10° C., the precipitated solid is filtered off and dried, yielding 1-chloro-4,4-di-(4-methyl-phenyl)-butane; M.P. 44–46° C.

To a solution of 139 parts piperazine in 480 parts 2-propanol is added dropwise a solution of 70 parts 1-chloro-4,4-di-(4-methyl-phenyl)-butane in 120 parts benzene at room temperature. After the addition is complete, the whole is stirred and refluxed for 3 hours. After cooling overnight the formed precipitate is filtered off and the filtrate is evaporated. The residue is triturated in 1000 parts water. This aqueous suspension is alkalized with sodium hydroxide solution and extracted with chloroform. The extract is washed several times with water, dried over magnesium sulfate, filtered and evaporated. The oily residue is distilled in vacuo, yielding 1-[4,4-di-(4-methyl-phenyl)-butyl]-piperazine; B.P. 180–190° C. and 0.1 mm. pressure.

A mixture of 6.5 parts 1-[4,4-di-(4-methyl-phenyl)-butyl]-piperazine, 4.3 parts N-(2-chloro-acetyl)-2,5-dimethyl-aniline, 3.18 parts sodium carbonate, a few crystals of potassium iodide in 200 parts 4-methyl-2-pentanone is stirred and refluxed for 48 hours. After cooling there are added 100 parts water. The organic layer is separated, dried over potassium carbonate, filtered and evaporated. The oily residue is dissolved in diethyl-ether and after standing this solution for a few hours at room temperature, a solid is precipitated. It is filtered off and recrystallized from a mixture of ethanol and water, yielding 1-[4,4-di-(4-methyl-phenyl)-butyl]-4-[(2,6-dimethyl-anilino-carbonyl)-methyl]-piperazine; M.P. 143–144° C.

Example XXXIX

To a solution of 100 parts piperazine in 480 parts 2-propanol is added a solution of 80 parts 1-bromo-4,4-di-(3-trifluoromethyl-phenyl)-butane in 180 parts benzene. After the addition is complete, the whole is stirred and refluxed for 3 hours. After cooling, the solid matter is filtered off and the filtrate is evaporated. The oily residue is dissolved in 500 parts water and the solution is extracted with 1125 parts chloroform. The extract is washed with 1000 parts water, dried, filtered and evaporated. The oily residue is distilled in vacuo, yielding 1-[4,4-di-(3-trifluoromethyl-phenyl)-butyl]-piperazine; B.P. 169–171° C. at 0.3 mm. pressure.

A mixture of 7 parts 1-[4,4-di-(3-trifluoromethyl-phenyl)-butyl]-piperazine, 4 parts N-(2-chloro-acetyl)-2,-dimethyl-aniline, 2,6 parts sodium carbonate, a few crystals of potassium iodide in 200 parts 4-methyl-2-pentanone is stirred and refluxed for 70 hours. After cooling there are added 70 parts water. The organic layer is separated, dried over potassium carbonate, filtered and evaporated. The oily residue is dissolved in a mixture of ether and diisopropylether. The sodium is filtered and gaseous hydrogen chloride is introduced into the filtrate. The precipitated salt is filtered off and recrystallized twice: first from a mixture of methanol and ether and then from a mixture of ethanol and ether, yielding 1-[4,4-di-(3 - trifluoromethyl-phenyl)-butyl]-4-[(2,6-dimethyl-anilino-carbonyl)-methyl]-piperazine dihydrochloride; M.P. 224–225.5° C.

Example XL

To a cooled solution (about 10° C.) of 49.5 parts 1-[4,4-di-(4-fluoro-phenyl)-butyl]-piperazine in 240 parts methanol is added a solution of 20 parts ethyleneoxide in 40 parts methanol. After the addition is complete, the whole is heated to 40° C., and while maintaining this temperature, an excess gaseous ethyleneoxide is introduced into it, in the course of 30 minutes. The whole is evaporated. The residue is dissolved in a mixture of 2-propanol and diisopropyl-ether and gaseous hydrogen chloride is introduced into it. The precipitated salt is filtered off and dried, yielding 1-[4,4-di-(4-fluoro-phenyl)-butyl] - 4 - (2-hydroxy-ethyl)-piperazine dihydrochloride; M.P. 175–186° C.

To a mixture of 80 parts thionylchloride and 75 parts chloroform are added portionwise 19.5 parts 1-[4,4-di-(4-fluoro-phenyl)-butyl]-4-(2-hydroxy-ethyl)-piperazine dihydrochloride. After the addition is complete, the whole is refluxed for 3 hours. The reaction mixture is evaporated. The solid residue is recrystallized from boiling acetone, filtered off and dried, yielding 1-[4,4-di-(4-fluoro-phenyl) - butyl] - 4-(2-chloro-ethyl)-piperazine dihydrochloride; M.P. 210–212° C. (dec.).

A mixture of 4.6 parts 1-[4,4-di-(4-fluoro-phenyl)-butyl]-4-(2-chloro-ethyl)-piperazine dihydrochloride, 1.3 parts 4-fluoro-aniline, 35 parts triethylamine and 180 parts xylene is refluxed for 20 hours. After cooling there are added 100 parts water. The organic layer is separated, dried over potassium carbonate and evaporated. The oily residue is dissolved in diisopropylether and gaseous hydrogen chloride is introduced into the solution. The precipitated salt is filtered off and recrystallized from 2-propanol, yielding 1-[4,4-di-(4-fluoro-phenyl)-butyl]-4-[2-(4-fluoro-anilino)-ethyl]-piperazine trihydrochloride; M.P. 221–224° C.

Example XLI

A mixture of 4.6 parts 1-[4,4-di-(4-fluoro-phenyl)-butyl]-4-(2-chloro-ethyl)-piperazine dihydrochloride, 1.3 parts 3-methoxy-aniline, 35 parts triethylamine and 170 parts butanol is stirred and refluxed for 48 hours. After cooling there are added 100 parts water to the reaction mixture. The organic layer is separated, dried over magnesium sulfate, filtered and evaporated. The oily residue is dissolved in a mixture of 160 parts 2-propanol and 70 parts diisopropylether. The solution is saturated with gaseous hydrogen chloride. The precipitated salt is filtered off and recrystallized from 40 parts 2-propanol, yielding 1 - [4,4-di-(4-fluoro-phenyl)-butyl]-4-[2-(3-methoxy-anilino)-ethyl]-piperazine trihydrochloride; M.P. 193–194.5° C.

Example XLII

A mixture of 4.6 parts 1-[4,4-di-(4-fluoro-phenyl)-butyl]-4-(2-chloro-ethyl)-piperazine dihydrochloride, 1.3 parts 4-methoxy-aniline, 35 parts triethylamine and 180 parts xylene is stirred and refluxed for 20 hours. After cooling there are added 70 parts of a concentrated sodium hydroxide solution. The organic layer is separated, dried over potassium carbonate, filtered and evaporated. The oily residue is dissolved in 40 parts 2-propanol and gaseous hydrogen chloride is introduced into the solution. The precipitated salt is filtered off and dried, yielding 1 - [4,4-di-(4-fluoro-phenyl)-butyl]-4-[2-(4-methoxy-anilino)-ethyl]-piperazine trihydrochloride; M.P. 219–221° C.

Example XLIII 202 parts N-(2-bromo-ethyl)-aniline hydrobromide are added portionwise to 494.5 parts piperazine in 2000 parts 2-propanol at room temperature over a period of 3 hours. The whole is then stirred overnight, after which the precipitated solid is filtered off. The filtrate is evaporated and the residue is rendered alkaline. The whole is extracted with chloroform. The extract is washed with water, dried over magnesium sulfate, filtered and evaporated. The oily residue is distilled in vacuo, yielding 1-(2-anilino-ethyl)-piperazine; B.P. 140–160° C. at 0.4–0.5 mm. pressure.

A mixture of 2 parts dl-1-chloro-4-phenyl-4-(4-methyl-phenyl)-butane, 1.6 parts 1-(2-anilino-ethyl)-piperazine, 0.32 parts sodium carbonate, a few crystals of potassium iodide in 200 parts 4-methyl-2-pentanone is stirred and refluxed for 90 hours. After cooling there are added 80 parts water. The organic layer is separated, dried over potassium carbonate, filtered and evaporated. The oily residue is dissolved in 350 parts anhydrous diisopropyl-ether. The solution is filtered and gaseous hydrogen chloride is introduced into the filtrate. The precipitated salt is filtered off and recrystallized from a mixture of 80 parts 2-propanol and 160 parts methanol. The filtered solution is kept for 2 days at 0° C. Then the formed precipitate is filtered off and dried, yielding dl-1-[4-phenyl-4-(4-methyl-phenyl)-butyl]-4-(2-anilino-ethyl)-piperazine trihydrochloride; M.P. 207–214.5° C. (dec.).

*Example XLIV*

A mixture of 6 parts dl-1-chloro-4-(4-fluoro-phenyl)-4-(4-methyl-phenyl)-butane, 4.1 parts 1-(2-anilino-ethyl)-piperazine, 3.2 parts sodium carbonate, a few crystals of potassium iodide in 200 parts 4-methyl-2-pentanone is stirred and refluxed for 65 hours. After cooling there are added 150 parts water. The organic layer is separated, dried over potassium carbonate, filtered and evaporated. The oily residue is dissolved in 525 parts diisopropylether. The solution is filtered and gaseous hydrogen chloride is introduced into the filtrate. The precipitated salt is filtered off and recrystallized from 80 parts methanol, yielding dl-1-[4-(4-fluoro-phenyl)-4-(4-methyl-phenyl)-butyl]-4-(2-anilino-ethyl)-piperazine trihydrochloride; M.P. 213.5–223° C.

*Example XLV*

A mixture of 5.4 parts dl-1-chloro-4-(4-fluoro-phenyl)-4-(2-thienyl)-butane, 4.1 parts 1-(2-anilino-ethyl)-piperazine, 3.2 parts sodium carbonate, a few crystals of potassium iodide in 200 parts 4-methyl-2-pentanone is stirred and refluxed for 65 hours. After cooling there are added 50 parts water. The organic layer is separated, dried over potassium carbonate, filtered and evaporated. The oily residue is dissolved in 525 parts diisopropylether. The solution is filtered and gaseous hydrogen chloride is introduced into the filtrate. The precipitated salt is filtered off and recrystallized from a mixture of 160 parts 2-propanol and 160 parts methanol, yielding dl-1-[4-(4-fluoro-phenyl)-4-(2-thienyl)-butyl]-4-(2-anilino-ethyl)-piperazine trihydrochloride; M.P. 202.5–214.5° C. (dec.).

*Example XLVI*

A mixture of 5.9 parts 1-chloro-4,4-di-(4-methyl-phenyl)-butane, 4.1 parts 1-(2-anilino-ethyl)-piperazine, 3.18 parts sodium carbonate, a few crystals of potassium iodide in 200 parts 4-methyl-2-pentanone is stirred and refluxed for 70 hours. After cooling there are added 80 parts water. The organic layer is separated, dried over potassium carbonate, filtered and evaporated. The oily residue is dissolved in 490 parts anhydrous diisopropylether. The solution is filtered and gaseous hydrogen chloride is introduced into the filtrate. The precipitated salt is filtered off and recrystallized from a mixture of 240 parts 2-propanol and 240 parts methanol. The solution is filtered and after keeping the filtrate overnight at room temperature, the formed precipitate is filtered off, yielding 1-[4,4-di-(4-methyl-phenyl)-butyl]-4-(2-anilino-ethyl)-piperazine trihydrochloride; M.P. 215–220.5° C.

*Example XLVII*

To a solution of 499 parts piperazine in 1840 parts 2-propanol is added a solution of 197.1 parts N-(2-chloro-acetyl)-2,6-dimethyl-aniline in 1800 parts benzene. The whole is stirred and refluxed for 7 hours. The solvents are evaporated. The solid residue is washed with sodium hydroxide solution 10% and extracted with chloroform. The extract is washed with water, dried over magnesium sulfate, filtered and evaporated. The solid residue is triturated in diisopropylether, filtered off and dried, yielding 1-[(2,6-dimethyl-anilino - carbonyl) - methyl]-piperazine; M.P. 110–114° C.

A mixture of 5.8 parts dl-1-chloro-4-(4-fluoro-phenyl)-4-(4-methyl-phenyl)-butane, 4.9 parts 1-[(2,6-dimethyl-anilino-carbonyl)-methyl]-piperazine, 3.18 parts sodium carbonate, a few crystals of potassium iodide in 200 parts 4-methyl-2-pentanone is stirred and refluxed for 70 hours. After cooling there are added 100 parts water. The organic layer is separated, dried over potassium carbonate, filtered and evaporated. The oily residue is dissolved in ether. This solution is filtered and gaseous hydrogen chloride is introduced into the filtrate. The precipitated salt is filtered off and recrystallized from a mixture of 240 parts 2-propanol and 320 parts methanol, yielding dl-1-[4-(4-fluoro-phenyl) - 4 - (4-methyl-phenyl)-butyl]-4-[(2,6-dimethyl-anilino - carbonyl) - methyl]-piperazine dihydrochloride; M.P. 250–253° C.

*Example XLVIII*

A mixture of 20.8 parts 1-(4,4-diphenyl-butyl)-4-(2-anilino-ethyl)-piperazine trihydrochloride, 20 parts acetic anhydride, 56 parts triethylamine and 600 parts chloroform is stirred and refluxed for 2 hours. After cooling there are added 500 parts water and the whole is made strongly alkaline by addition of sodium hydroxide solution. The organic layer is decanted, washed three times with 500 parts water, dried over magnesium sulfate and evaporated. The oily residue is dissolved in anhydrous ether and gaseous hydrogen chloride is introduced into the solution. The precipitated salt is filtered off and recrystallized twice: first from 240 parts 2-propanol and then from a mixture of 360 parts 2-propanol and 240 parts acetone, yielding 1-(4,4-diphenyl-butyl)-4-[2-(N-acetyl-anilino)-ethyl]-piperazine dihydrochloride; M.P. 221–223° C.

*Example XLIX*

A mixture of 20.8 parts 1-(4,4-diphenyl-butyl)-4-(2-anilino-ethyl)-piperazine trihydrochloride, 20 parts propionic anhydride, 56 parts triethylamine and 600 parts chloroform is stirred and refluxed for 2 hours. After cooling there are added 500 parts water. The whole is alkalized with sodium hydroxide solution. The organic layer is decanted, dried, filtered and evaporated. The oily residue is dissolved in ether and gaseous hydrogen chloride is introduced into the solution. The precipitated salt is filtered off and recrystallized from 380 parts 2-propanol, yielding 1 - (4,4-diphenyl-butyl)-4-[2-(N-propionyl - anilino) - ethyl]-piperazine dihydrochloride; M.P. 225–226° C.

*Example L*

To a solution of 20 parts dl-1-[4-phenyl-4-(4-fluoro-phenyl)-butyl]-4-(2-anilino-ethyl) - piperazine in 200 parts benzene is added portionwise 6.1 parts acetic anhydride. After the addition is complete, the whole is stirred and refluxed for 3 hours. After cooling the reaction mixture is alkalized with diluted sodium hydroxide solution. The organic layer is separated, dried, filtered and evaporated. The oily residue is dissolved in 600 parts ether. The solution is filtered and gaseous hydrogen chloride is introduced into the filtrate. The precipitated salt is filtered off and dried, and recrystallized twice from a mixture of methanol and ether, yielding dl-1-[4-phenyl - 4 - (4 - fluoro-phenyl)-butyl]-4-[2-(N-acetyl-anilino)-ethyl]-piperazine dihydrochloride; M.P. 198–208° C.

*Example LI*

To a solution of 20 parts dl-1-[4-phenyl-4-(4-fluoro-phenyl)-butyl] - 4 - (2-anilino-ethyl)-piperazine in 200 parts benzene are added portionwise 8.1 parts propionic anhydride. After the addition is complete, the whole is stirred and refluxed for 15 hours. After cooling the reaction mixture is alkalized with diluted sodium hydroxide solution. The organic layer is separated, dried over potassium carbonate, filtered and evaporated. The oily residue is dissolved in diethylether. This solution is filtered and gaseous hydrogen chloride is introduced into the filtrate. The precipitated salt is filtered off and recrystallized from a mixture of methanol and ether, yielding dl-1-[4-phenyl-4-(4-fluoro-phenyl) - butyl] - 4 - [2-(N-propionyl-anilino)-ethyl]-piperazine dihydrochloride; M.P. 207–210° C.

*Example LII*

To a suspension of 5.6 parts 1-[4,4-di-(4-fluoro-phenyl)-butyl]-4-(2-anilino-ethyl)-piperazine trihydrochloride in 150 parts chloroform are added 14 parts triethylamine and 5 parts acetic anhydride. The whole is stirred and refluxed for 2 hours. After cooling there are added 100 parts water and the mixture is alkalized with sodium hydroxide. The organic layer is separated, dried over potassium carbonate and evaporated. The oily residue is dissolved in diisopropylether and gaseous hydrogen chloride is introduced into the solution. The precipitated salt is filtered off and recrystallized from 80 parts 2-propanol, yielding 1-[4,4-di-(4-fluoro-phenyl)-butyl]-4-[2-(N-acetyl-anilino)-ethyl]-piperazine dihydrochloride; M.P. 213–215° C.

*Example LIII*

A mixture of 10 parts 1 - [4,4 - di - (4 - fluoro-phenyl) - butyl] - 4 - (2 - anilino - ethyl) - piperazine trihydrochloride, 28 parts triethylamine and 140 parts chloroform is stirred and refluxed for 2 hours. After cooling there are added 150 parts water. The whole is alkalized with sodium hydroxide. The organic layer is separated, dried over potassium carbonate, filtered and evaporated. The oily residue is dissolved in 480 parts diisopropylether. This solution is filtered and gaseous hydrogen chloride is introduced into the filtrate. The precipitated salt is filtered off and recrystallized from 80 parts 2 - propanol, yielding 1 - [4,4 - di - (4 - fluoro-phenyl) - butyl] - 4 - [2 - (N - propionyl - anilino)-ethyl] - piperazine dihydrochloride; M.P. 213–228° C.

*Example LIV*

An aqueous solution of 14 parts dl - 1 - [4 - phenyl-4 - (4 - fluoro - phenyl) - butyl] - 4 - [2 - (anilino - carbonyl) - ethyl] - piperazine dihydrochloride is alkalized with sodium hydroxide and extracted with chloroform. The extract is dried over magnesium sulfate, filtered and evaporated. The residue is dissolved in 100 parts tetrahydrofurane. To this solution is added a suspension of 2.1 parts lithium tetrahydroaluminate in 100 parts tetrahydrofurane, while keeping the temperature at about 30° C. (slightly exothermic reaction). The whole is stirred and refluxed for 3 hours. After cooling the reaction mixture below 15° C. it is decomposed by successive addition of 7 parts water, 17.5 parts sodium hydroxide solution 20% and 7 parts water. The mixture is filtered and the gelatinous precipitate is washed twice with ether. The organic layers are dried over potassium carbonate, filtered and evaporated. The residue is dissolved in 560 parts ether. The solution is dried over potassium carbonate and gaseous hydrogen chloride is introduced into the filtrate. The precipitated salt is filtered off and recrystallized from a mixture of 400 parts methanol and 20 parts water, yielding dl-1-[4-phenyl-4 - (4 - fluoro - phenyl) - butyl] - 4 - (3 - anilino - propyl)-piperazine trihydrochloride; M.P. 247–250.5° C.

*Example LV*

To a suspension of 2 parts lithium tetrahydridoaluminate in 90 parts anhydorus tetrahydrofurane is added dropwise a solution of 9.2 parts 1-[4,4-di-(4-fluoro-phenyl) - butyl]-4-[2-(anilino-carbonyl)-ethyl]-piperazine in 90 parts anhydrous tetrahydrofurane at a temperature of about 35° C. in the course of about 20 minutes (slightly exothermic reaction). After the addition is complete, the whole is stirred and refluxed for 2 hours. After cooling the reaction mixture is decomposed by successive addition of 8 parts water, 16 parts sodium hydroxide solution 20% and 8 parts water. The formed precipitate is filtered off, washed with ether and the combined organic layers are evaporated. The oily residue is dissolved in 400 parts ether. The solution is dried over potassium carbonate, filtered and gaseous hydrogen chloride is introduced into the filtrate. The precipitated solid salt if filtered off and recrystallized from a mixture of 80 parts 2-propanol and 160 parts methanol, yielding 1 - [4,4 - di - (4 - fluoro - phenyl) - butyl] - 4-(3 - anilino - propyl) - piperazine trihydrochloride; M.P. 235.5–236.5° C.

*Example LVI*

To a mixture of 1.28 parts lithium tetrahydridoaluminate and 45 parts tetrahydrofurane is added dropwise a solution of 8 parts 1 - (4,4-diphenyl-butyl)-4-[2-(N-propionyl-anilino)-ethyl]-piperazine in 45 parts tetrahydrofurane (slightly exothermic reaction). After the addition is complete, the whole is stirred and refluxed for 3 hours. After cooling the reaction mixture is decomposed by successive addition of 5 parts water, 5 parts sodium hydroxide solution 20% and 10 parts water. The whole is filtered from some insoluble matter and the filtrate is evaporated. The oily residue is dissolved in anhydrous ether and gaseous hydrogen chloride is introduced into the solution. The precipitated salt is filtered off and recrystallized from 120 parts methanol, yielding 1 - (4,4 - diphenyl - butyl) - 4 - [2 - (N - propyl-anilino) - ethyl] - piperazine dihydrochloride; M.P. 210–213.5° C.

*Example LVII*

A solution of 7.3 parts 1-[4,4-di-(4-fluoro-phenyl)-butyl] - 4 - [2 - (N - acetyl - anilino) - ethyl] - piperazine in 45 parts tetrahydrofurane is added dropwise to a solution of 1.1 parts lithium tetrahydridoaluminate in 45 parts tetrahydrofurane. After the addition is complete, the reaction mixture is heated to reflux for 2 hours. After cooling the reaction mixture is decomposed by successive addition of 4 parts water, 4 parts sodium hydroxide solution 25% and 8 parts water. The solution is filtered from some inorganic matter and the filtrate is evaporated. The residue is dissolved in diisopropylether and gaseous hydrogen chloride is introduced into this solution. The precipitated salt is filtered off and recrystallized twice: first from a mixture of 40 parts 2-propanol and 40 parts methanol and then from 60 parts 2-propanol, yielding 1-[4,4-di-(4-fluoro-phenyl)-butyl]-4-[2-(N-ethyl-anilino)-ethyl]-piperazine trihydrochloride; M.P. 214–216° C.

*Example LVIII*

An aqueous solution of 5 parts 1-[4,4-di-(4-fluoro-phenyl)-butyl]-4-[2-(N-propionyl-anilino)-ethyl] - piperazine dihydrochloride is alkalized with sodium hydroxide and extracted with ether. The extract is dried and evaporated. The residue is dissolved in 45 parts anhydrous tetrahydrofurane and the whole is added dropwise to a suspension of 1 part lithium tetrahydridoaluminate in 45 parts anhydrous tetrahydrofurane at a temperature of 30–35° C. (slightly exothermic reaction). After the addition is complete, the whole is stirred and refluxed for 2 hours. After cooling the reaction mixture is decomposed by successive addition of 2 parts water, 4 parts sodium hydroxide solution 20% and 2 parts water. The formed precipitate is filtered off and washed twice with 400 parts diisopropylether. The combined organic layers are dried and evaporated. The residue is dissolved in 400 parts diisopropylether and after filtering, gaseous hydrogen chloride is introduced into the filtrate. The precipitated salt is filtered off and recrystallized from 60 parts 2-propanol, yielding 1 - [4,4 - di - (4 - fluoro - phenyl) - butyl] - 4-

[2 - (N - propyl - anilino) - ethyl] - piperazine trihydrochloride; M.P. 219–226° C.

From the mother liquor a second fraction is obtained after standing at room temperature. This fraction is recrystallized from 70 parts 2-propanol, yielding 1-[4,4-di - (4 - fluoro - phenyl) - butyl] - 4 - [2 - (N - propylanilino)-ethyl]-piperazine dihydrochloride; M.P. 209–217° C. (dec.).

*Example LIX*

A mixture of 10 parts 1 - [2,4 - di - (4 - fluoro-phenyl) - butyl] - piperazine, 8.5 parts dl - N - (2-bromo-propionyl)aniline, 9.5 parts sodium carbonate, a few crystals of potassium iodide and 200 parts 4-methyl-2-pentanone is stirred and refluxed for 48 hours. After cooling there are added 100 parts water. The organic layer is separated, dried over potassium carbonate and evaporated. The oily residue is dissolved in a mixture of 80 parts 2-propanol and 70 parts diisopropylether and gaseous hydrogen chloride is introduced into the solution. The precipitated hydrochloride is filtered off, yielding dl-1-[4,4 - di - (4 - fluoro - phenyl) - butyl] - 4 - [1 - anilino-carbonyl)-ethyl]-piperazine dihydrochloride; M.P. 240–241° C. The salt is converted to the free base form by reaction with an appropriate alkali.

*Example LX*

To 60 parts tetrahydrofurane are added 1.2 parts lithium tetrahydrido-aluminate and the whole is heated to about 30° C. While keeping this temperature, there is added dropwise a solution of 7.1 parts dl-1-[4,4-di-(4-fluoro-phenyl)-butyl] - 4-[1-(anilino-carbonyl) - ethyl]-piperazine in 50 parts tetrahydrofurane (slightly exothermic reaction). After the addition is complete, the mixture is stirred and refluxed for 2 hours. After cooling the reaction mixture to about 10° C., it is decomposed by successive addition of 4 parts water, 10 parts of a 20% sodium hydroxide solution and 4 parts water. The mixture is filtered and the gelatinous precipitate is washed twice with ether. The solvent is evaporated. The oily residue is dissolved in 120 parts boiling 2-propanol. To this hot solution is added a warm solution of an equivalent quantity of oxalic acid dihydrate in 2-propanol. After cooling to room temperature, the precipitated salt is filtered off and dried, yielding crude dl-1-[4,4-di - (4-fluoro-phenyl) - butyl] - 4-(1-anilino-2-propyl)-piperazine dioxalate. This crop is recrystallized from a mixture of 160 parts methanol, 80 parts 2-propanol and 50 parts water. The undissolved parts are filtered off and dried, yielding dl-1-[4,4-di(4-fluoro-phenyl)-butyl]-4-(1-anilino - 2-propyl)-piperazine dioxalate; M.P. 224–225° C.

*Example LXI*

A mixture of 20 parts 1-[4,4-di-(4-fluoro-phenyl)-butyl]-piperazine, 13.2 parts N-(4-chloro-butyroyl)-aniline, 9.5 parts sodium carbonate, a few crystals of potassium iodide in 400 parts 4-methyl-2-pentanone is stirred and refluxed for 50 hours. The reaction mixture is cooled and there are added 200 parts water. The organic layer is separated, dried over potassium carbonate, filtered and evaporated. The oily residue is dissolved in 1200 parts ethanol. The solution is filtered and gaseous hydrogen chloride is introduced into the filtrate. The precipitated salt is filtered off and recrystallized twice: first from 80 parts 2-propanol and then from a mixture of 40 parts methanol and 80 parts ether, yielding 1-[4,4-di-(4-fluoro-phenyl)-butyl]-4-[3-(anilino-carbonyl) - propyl]-piperazine dihydrochloride; M.P. 199.5–201° C.

*Example LXII*

A mixture of 6.7 parts 1-[4,4-di-(4-fluoro-phenyl)-butyl]-piperazine, 5.6 parts dl-N-(2-bromo-propionyl)-2,6-dimethyl-aniline, 3.2 parts sodium carbonate, a few crystals of potassium iodide in 200 parts 4-methyl-2-pentanone is stirred and refluxed for 40 hours. After cooling there are added 50 parts water. The organic layer is separated, dried over potassium carbonate, filtered and evaporated. The oily residue is dissolved in 400 parts ether. The solution is filtered and gaseous hydrogen chloride is introduced into the filtrate. The precipitated salt is filtered off and recrystallized from 240 parts methanol, yielding dl-1-[4,4-di-(4-fluoro-phenyl)-butyl] - 4-[1-(2,6-dimethyl-anilino-carbonyl)-ethyl]-piperazine dihydrochloride; M.P. 189.5–193° C.

*Example LXIII*

To a stirred and refluxing mixture of 19 parts dl-1-benzyl-2-methyl-piperazine, 32 parts sodium carbonate, a few crystals of potassium iodide in 500 parts 4-methyl-2-pentanone is added dropwise a solution of 33.7 parts 1-chloro - 4,4 - di - (4-fluoro-phenyl)-butane in 50 parts 4-methyl-2-pentanone. After the addition is complete, the whole is further stirred and refluxed for 48 hours. After cooling there are added 300 parts water. The organic layer is separated, dried over magnesium sulfate, filtered and evaporated. The oily residue is dissolved in 800 parts diisopropylether. The turbid solution is filtered several times until clear and then gaseous hydrogen chloride is introduced into the filtrate. The precipitated solid salt is filtered off and recrystallized from boiling 2-propanol. After cooling to room temperature, the solid is filtered off and dried, yielding dl-1-[4,4-di-(4-fluoro-phenyl) - butyl]-3-methyl - 4-benzyl-piperazine dihydrochloride; M.P. 222–225° C. The salt is converted to the free base form by reaction with an appropriate alkali.

A solution of 31.8 parts dl-1-[4,4-di(4-fluoro-phenyl)-butyl] - 3-methyl - 4-benzyl-piperazine in 280 parts denatured ethanol is hydrogenated at normal pressure and at room temperature, in the presence of 8 parts of palladium-on-charcoal catalyst 5%. After the calculated amount of hydrogen is taken up, hydrogenation is stopped. The catalyst is filtered off and the filtrate is evaporated. The oily residue is distilled in vacuo, to yield oily dl-1-[4,4-di-(4-fluoro-phenyl)-butyl]-3-methyl-piperazine; B.P. 170–175° C. at 0.15 mm. pressure.

A mixture of 6.9 parts dl-1-[4,4-di(4-fluoro-phenyl)-butyl] - 3-methyl-piperazine, 4.4 parts N-(2-chloro-acetyl)-2,6-dimethyl-aniline, 6.4 parts sodium carbonate, a few crystals of potassium iodide in 160 parts 4-methyl-2-pentanone is stirred and refluxed for 48 hours. After cooling there are added 150 parts water. The organic layer is separated, dried over 4-methyl-2-pentanone and evaporated. The oily residue is dissolved in 480 parts diisopropylether. The turbid solution is filtered until clear and gaseous hydrogen chloride is introduced into the filtrate. The precipitated solid salt is filtered off and recrystallized from a mixture of 2-propanol and methanol, to yield dl-1-[4,4-di-(4-fluoro-phenyl) - butyl]-3-methyl - 4-[(2,6-dimethylanilino-carbonyl) - methyl]-piperazine dihydrochloride; M.P. 239–246° C.

*Example LXIV*

A mixture of 6.9 parts dl-1-[4,4-di(4-fluoro-phenyl)-butyl]-3-methyl-piperazine, 5.9 parts N-(2-bromo-ethyl)-aniline hydrobromide, 8.5 parts sodium carbonate, a few crystals of potassium iodide in 160 parts 4-methyl-2-pentanone is stirred and refluxed for 48 hours. After cooling there are added 150 parts water. The organic layer is separated, dried over magnesium sulfate, filtered and evaporated. The oily residue is dissolved in diisopropylether. The solution is filtered until clear and gaseous hydrogen chloride is introduced into the filtrate. The precipitated solid salt is filtered off and recrystallized twice from a mixture of methanol and anhydrous ether, yielding, after drying overnight at about 60–70° C. in vacuo, dl-1-[4,4-di-(4-fluoro-phenyl)-butyl] - 3-methyl-4-

(2-anilinoethyl)piperazine trihydrochloride; M.P. 234–235° C.

Example LXV

A mixture of 6.9 parts dl-1-[4,4-di-(4-fluoro-phenyl)-butyl]-3-methyl-piperazine, 4.8 parts N-(2-chloro-acetyl)-2-chloro-6-methyl-aniline, 6.4 parts sodium carbonate, a few crystals of potassium iodide in 160 parts 4-methyl-2-pentanone is stirred and refluxed for 48 hours. After cooling there are added 150 parts water. The organic layer is separated, dried over magnesium sulfate, filtered and evaporated. The oily residue is dissolved in 480 parst diisopropyl-ether. The solution is filtered and gaseous hydrogen chloride is introduced into the filtrate. The precipitated solid salt is filtered off and recrystallized from a mixture of methanol and anhydrous ether, yielding dl-1-[4,4-di-(4-fluoro-phenyl)-butyl] - 3-methyl-4-[2-chloro - 6-methyl-anilino-carbonyl) - methyl]-piperazine dihydrochloride; M.P. 236.5–238° C. (dec.).

Example LXVI

A mixture of 6.9 parts dl-1-[4,4-di-(4-fluoro-phenyl)-butyl]-3-methyl-piperazine, 5.2 parts N-(2-chloro-acetyl)-2,6-dichloro-aniline, 6.4 parts sodium carbonate, a few crystals of potassium iodide in 160 parts 4-methyl-2-pentanone is stirred and refluxed for 48 hours. After cooling there are added 150 parts water. The organic layer is separated, dried over magnesium sulfate, filtered and evaporated. The oily residue is dissolved in 480 parts diisopropylether. The solution is filtered and gaseous hydrogen chloride is introduced into the filtrate. The precipitated salt is filtered off and recrystallized twice: first from 120 parts boiling 2-propanol and then from a mixture of methanol and anhydrous ether, to yield dl-1-[4,4-di(4-fluoro-phenyl)-butyl]-3-methyl-4-[(2,6-dichloro - anilino-carbonyl)-methyl]-piperazine dihydrochloride; M.P. 243–245° C. (dec.).

Example LXVII

A mixture of 6.9 parts of dl-1-[4,4-di(4-fluoro-phenyl)-butyl]-3-methyl-piperazine, 4 parts of N-(2-chloro-acetyl)-2-methyl-aniline, 6.4 parts of sodium carbonate, a few crystals of potassium iodide in 160 parts of 4-methyl-2-pentanone is stirred and refluxed for 48 hours. After cooling there is separated, dried over magnesium sulfate and evaporated. The oily residue is dissolved in 480 parts diisopropylether. This solution is filtered until clear and then gaseous hydrogen chloride is introduced into the filtrate. The precipitated solid is recrystallized from a mixture of 2-propanol and anhydrous ether, yielding dl-1-[4,4-di-(4-fluoro-phenyl)-butyl]-3-methyl-4-[(2 - methyl-anilino - carbonyl) - methyl] - piperazine dihydrochloride; M.P. 218–228.5° C.

Example LXVIII

A mixture of 6.9 parts of dl-1-[4,4-di-(4-fluoro-phenyl)-butyl]-3-methyl-piperazine, 4.4 parts of N-(2-chloro-acetyl)-3,4-dimethyl-aniline, 6.4 parts of sodium carbonate, a few crystals of potassium iodide in 160 parts of 4-methyl-2-pentanone is stirred and refluxed for 48 hours. After cooling there is added 150 parts of water. The organic layer is separated, dried over magnesium sulfate and evaporated. The oily residue is dissolved in 480 parts of diisopropylether. This solution is filtered several times until clear and gaseous hydrogen chloride is introduced into the filtrate. The formed precipitate is filtered off and recrystallized twice: first from a mixture of 2-propanol and anhydrous ether and then from a mixture of methanol and anhydrous ether, to yield dl-1-[4,4-di-(4-fluoro-phenyl)-butyl]-3-methyl-4 - [(3,4 - dimethyl - anilino - carbonyl)-methyl]-piperazine dihydrochloride; M.P. 209–210° C. (dec.).

Example LXIX

A mixture of 23.8 parts N-(2-chloro-acetyl)-2,6-dimethyl-aniline, 19 parts of dl-1-benzyl-2-methyl-piperazine, 32 parts sodium carbonate, a few crystals of potassium iodide in 520 parts 4-methyl-2-pentanone is stirred and refluxed for 48 hours. After cooling there are added 300 parts water. The organic layer is separated, dried over magnesium sulfate and evaporated. The oily residue is dissolved in diisopropylether. This solution is filtered until clear and then gaseous hydrogen chloride is introduced into the filtrate. The solid precipitate is filtered off, boiled in 2-propanol, filtered off again and dried, to yield a sticky salt. It is stirred in acetone and dried again, to yield dl-1-[(2,6-dimethyl-anilino-carbonyl)-methyl]-3 - methyl - 4-benzyl-piperazine dihydrochloride; M.P. 273–274° C. The salt is converted to the free base form by reaction with an appropriate alkali.

A solution of 26 parts dl-1-[(2,6-dimethyl-anilino-carbonyl)-methyl]-3-methyl-4-benzyl-piperazine in 280 parts denatured ethanol is hydrogenated at normal pressure and at room temperature in the presence of 10 parts palladium-on-charcoal catalyst 5%. After the calculated amount of hydrogen is taken up, hydrogenation is stopped. The catalyst is filtered off and the filtrate is evaporated, yielding a semi-solid residue as dl-1-[(2,6-dimethyl-anilino-carbonyl)-methyl]-3-methyl-piperazine which is used without further purification for the preparation of the next step. On standing the residue solidifies which melts at about 94–95° C.

A mixture of 6.2 parts 1-chloro-4,4-di-(4-fluoro-phenyl)-butane, 5.2 parts dl-1-[(2,6-dimethyl-anilino-carbonyl)-methyl]-3-methyl-piperazine, 6.5 parts sodium carbonate, a few crystals of potassium iodide in 160 parts 4-methyl-2-pentanone is stirred and refluxed for 48 hours. After cooling there are added 150 parts water. The organic layer is separated, dried over magnesium sulfate and evaporated. The solid residue is recrystallized from 4-methyl-2-pentanone, yielding dl-1-[4,4-di-(4-fluoro-phenyl)-butyl]-2-methyl-4-[(2,6 dimethyl-anilino-carbonyl - methyl]-piperazine; M.P. 185–186° C.

Example LXX

A mixture of 45 parts N-(2-bromo-ethyl)-aniline hydrobromide, 28.5 parts dl-1-benzyl-2-methyl-piperazine, 64 parts sodium carbonate, a few crystals of potassium iodide in 480 parts 4-methyl-2-pentanone is stirred and refluxed for 48 hours. After cooling there is added 300 parts water. The organic layer is separated, dried over magnesium sulfate and evaporated. The oily residue is dissolved in 1200 parts diisopropylether. The solution is filtered until clear and gaseous hydrogen chloride is introduced into the filtrate. The precipitated salt is filtered off and recrystallized from a mixture of methanol and anhydrous ether, yielding dl-1-(2-anilino-ethyl)-3-methyl-4-benzyl-piperazine trihydrochloride; M.P. 182–217° C. (dec.). The salt is converted to the free base form by reaction with an appropriate alkali.

A solution of 27.3 parts of dl-1-(2-anilino-ethyl)-3-methyl-4-benzyl-piperazine in 280 parts of denatured ethanol is hydrogenated at normal pressure and at room temperature, in the presence of 9 parts of palladium-on-charcoal catalyst 5%. After the calculated amount of hydrogen is taken up, hydrogenation is stopped. The catalyst is filtered off and the filtrate is evaporated. The oily residue is distilled in vacuo, yielding oily dl-1-(2-anilino-ethyl)-3-methyl-piperazine; B.P. 119–120° C. at 0.15 mm. pressure.

A mixture of 6.2 parts of 1-chloro-4,4-di-(4-fluoro-phenyl)-butane, 4.4 parts of dl-1-(2-anilino-ethyl)-3-methyl-piperazine, 6.4 parts of sodium carbonate, a few crystals of potassium iodide in 160 parts of 4-methyl-2-pentanone is stirred and refluxed for 48 hours. After cooling there is added 150 parts water. The organic layer is separated, dried over magnesium sulfate, and evaporated. The oily residue is dissolved in 640 parts diisopropylether. The solution is filtered until clear and gaseous hydrogen chloride is introduced into the filtrate. The precipitated salt is filtered off and recrystallized from 160 parts of boiling 2-propanol. After cooling to room temperature, dl-1-[4,4-di-(4-fluoro-phenyl)-butyl]-2-methyl-4-(2-anilino-ethyl)-piperazine trihydrochloride are obtained; M.P. 212–224° C.

*Example LXXI*

A mixture of 23.1 parts 1-chloro-4,4-di-(4-fluoro-phenyl)-butane, 13 parts 1-benzyl-perhydro-1,4-diazepine, 22.26 parts sodium carbonate, a few crystals of potassium iodide in 400 parts 4-methyl-2-pentanone is stirred and refluxed for 2 days. After cooling there are added 500 parts water. The organic layer is separated, dried over potassium carbonate, filtered and evaporated. The oily residue is dissolved in diisopropylether and gaseous hydrogen chloride is introduced into the solution. The precipitated salt is filtered off and recrystallized from 160 parts acetone, yielding crude 1-[4,4-di-(4-fluoro-phenyl)-butyl]-4-benzyl-perhydro-1,4-diazepine dihydrochloride. After keeping the mother liquor at room temperature, a second fraction of crude 1-[4,4-di-(4-fluoro-phenyl)-butyl]-4-benzyl-perhydro-1,4-diazepine dihydrochloride is filtered off. Both crude fractions are recrystallized from a mixture of 2-propanol and acetone, yielding pure 1-[4,4-di-(4-fluoro-phenyl)-butyl]-4-benzyl-perhydrol-1,4-diazepine dihydrochloride; M.P. 215.4–216.4° C.

A solution of 40.5 parts 1-[4,4-di-(4-fluoro-phenyl)-butyl]-4-benzyl-perhydro-1,4-diazepine dihydrochloride in 400 parts ethanol 95% is hydrogenated at normal pressure and at room temperature in the presence of 8 parts palladium-on-charcoal catalyst 10%. After the calculated amount of hydrogen is taken up, hydrogenation is stopped. The catalyst is filtered off and the filtrate is evaporated. The oily residue is alkalized with sodium hydroxide and extracted with ether. The extract is dried over potassium carbonate, filtered and evaporated. The oily residue is distilled in vacuo, yielding oily 1-[4,4-di-(4-fluoro-phenyl)-butyl]-perhydro-1,4-diazepine; B.P. 196–197° C. at 0.05 mm. pressure.

A mixture of 5.5 parts 1-[4,4-di-(4-fluoro-phenyl)-butyl]-perhydro-1,4-diazepine, 3.94 parts N-(2-chloro-acetyl)-2,6-dimethyl-aniline, 6.36 parts sodium carbonate, a few crystals of potassium iodide in 200 parts 4-methyl-2-pentanone is stirred and refluxed for 2 days. After cooling there are added 250 parts water. The organic layer is separated, dried over potassium carbonate, filtered and evaporated. The oily residue is dissolved in anhydrous ether and gaseous hydrogen chloride is introduced into the solution. The precipitated solid is filtered off and recrystallized from a mixture of 160 parts acetone and 80 parts 2-propanol, yielding 1-[4,4-di-(4-fluoro-phenyl)-butyl]-4-[(2,6-dimethyl-anilino-carbonyl)-methyl]-perhydro-1,4-diazepine dihydrochloride; M.P. 240–246° C.

*Example LXXII*

A mixture of 5.5 parts 1-[4,4-di-(4-fluoro-phenyl)-butyl]-perhydro-1,4-diazepine, 4.3 parts N-(2-chloro-acetyl)-2-chloro-6-methyl-aniline, 6.36 parts sodium carbonate, a few crystals of potassium iodide in 200 parts 4-methyl-2-pentanone is stirred and refluxed for 2 days. After cooling there are added 250 parts water. The organic layer is separated, dried over potassium carbonate, filtered and evaporated. The oily residue is dissolved in 120 parts boiling 2-propanol. To this hot solution is added a warm solution of 4 parts oxalic acid dihydrate in 40 parts 2-propanol. After cooling to room temperature, the precipitated oxalate salt is filtered off and dried, yielding 1-[4,4-di-(4-fluoro-phenyl)-butyl]-4-[(2-chloro-6-methyl-anilino-carbonyl)-methyl]-perhydro-1,4-diazepine dioxalate; M.P. 145.5–150° C. (dec.).

*Example LXXIII*

A mixture of 5.5 parts 1-[4,4-di-(4-fluoro-phenyl)-butyl]-1,4-diazepine, 4.5 parts N-(2-chloro-acetyl)-2,6-diethyl-aniline, 6.36 parts sodium carbonate, a few crystals of potassium iodide in 200 parts 4-methyl-2-pentanone is stirred and refluxed for 2 days. After cooling there are added 250 parts water. The organic layer is separated, dried over potassium carbonate, filtered and evaporated. The oily residue is dissolved in 160 parts boiling 2-propanol. To this hot solution is added a warm solution of 4 parts oxalic acid dihydrate in 40 parts 2-propanol. After cooling to room temperature, the precipitated oxalate salt is filtered off and recrystallized from 320 parts methanol, yielding 1-[4,4-di-(4-fluoro-phenyl)-butyl]-4-[(2,6-diethyl-anilino-carbonyl)-methyl]-perhydro-1,4-diazepine dioxalate; M.P. 186–186.5° C.

*Example LXXIV*

A mixture of 5.5 parts 1-[4,4-di-(4-fluoro-phenyl)-butyl]-perhydro-1,4-diazepine, 5.2 parts N-(2-chloro-acetyl)-3,4-dimethyl-aniline, 6.36 parts sodium carbonate, a few crystals of potassium iodide in 200 parts 4-methyl-2-pentanone is stirred and refluxed for 2 days. After cooling there are added 250 parts water. The organic layer is separated, dried over potassium carbonate, filtered and evaporated. The oily residue is dissolved in 150 parts boiling 2-propanol. To this hot solution is added a warm solution of 3.78 parts oxalic acid dihydrate in 40 parts 2-propanol. After cooling to room temperature, the precipitated salt is filtered off and dried, yielding 1-[4,4-di-(4-fluoro-phenyl)-butyl]-4-[(3,4-dimethyl-anilino-carbonyl)-methyl]-perhydro-1,4-diazepine dioxalate; M.P. 182–183.5° C.

*Example LXXV*

A mixture of 5.5 parts 1-[4,4-di-(4-fluoro-phenyl)-butyl]-perhydro-1,4-diazepine, 5.6 parts N-(2-bromo-ethyl)-aniline hydrobromide, 8.5 parts sodium carbonate, a few crystals of potassium iodide in 200 parts 4-methyl-2-pentanone is stirred and refluxed for 2 days. After cooling there are added 250 parts water. The organic layer is separated, dried over potassium carbonate, filtered and evaporated. The oily residue is dissolved in 160 parts hot 2-propanol. To this hot solution is added a warm solution of 6 parts oxalic acid dihydrate in 80 parts 2-propanol. After cooling to room temperature, the precipitated oxalate is filtered off and recrystallized from a mixture of 400 parts methanol and 100 parts water, yielding 1-[4,4-di-(4-fluoro-phenyl)-butyl]-4-(2-anilino-ethyl)-perhydro-1,4-diazepine dioxalate; M.P. 173–177° C.

*Example LXXVI*

A mixture of 25 parts N-(2-chloro-acetyl)-2,6-dimethyl-aniline, 21 parts 1-benzyl-perhydro-1,4-diazepine, 36 parts sodium carbonate, a few crystals of potassium iodide in 800 parts 4-methyl-2-pentanone is stirred and refluxed for two days. After cooling there are added 750 parts water. The organic layer is separated, dried over potassium carbonate, filtered and evaporated. The oily residue is dissolved in ether and gaseous hydrogen chloride is introduced into the solution. The precipitated salt is filtered off and recrystallized from a mixture of 160 parts acetone and 80 parts 2-propanol, to yield 1-[(2,6-dimethyl-anilino-carbonyl)-methyl]-4-benzyl-perhydro-1,4-diazepine dihydrochloride; M.P. 221–230° C.

A mixture of 92 parts 1-[(2,6-dimethyl-anilino-carbonyl)-methyl]-4-benzyl-perhydro-1,4-diazepine dihydrochloride and 720 parts ethanol is hydrogenated at normal pressure and at room temperature in the presence of 21 parts palladium-on-charcoal catalyst 10%. After the calculated amount of hydrogen is taken up, hydrogenation is stopped. The catalyst is filtered off and the filtrate is evaporated. The solid residue is alkalized with ammonium hydroxide and extracted with chloroform. The extract is dried over magnesium sulfate and evaporated.

On standing the oily residue for a few minutes at room temperature, it partly solidifies, yielding 1-[(2,6-dimethyl-anilino-carbonyl)-methyl] - perhydro - 1,4 - diazepine; M.P. 80–86° C.

A mixture of 6.8 parts 1-chloro-4,4-di-(4-methylphenyl)-butane, 5.2 parts 1-[(2,6-dimethyl-anilino-carbonyl)-methyl]-perhydro-1,4-diazepine, 6.36 parts sodium carbonate, a few crystals of potassium iodide in 200 parts 4-methyl-2-pentanone is stirred and refluxed for 2 days. After cooling there are added 250 parts water. The organic layer is separated, dried over potassium carbonate, filtered and evaporated. The oily residue is dissolved in anhydrous ether and gaseous hydrogen chloride is introduced into the solution. The precipitated salt is filtered off and recrystallized from 2-propanol, yielding 1 - [4,4 - di - (4 - methyl - phenyl) - butyl] - 4 - [(2,6 - dimethyl - anilino - carbonyl) - methyl] - perhydro - 1,4 - diazepine dihydrochloride; M.P. 248.5–251.5° C.

*Example LXXVII*

A mixture of 6.6 parts of 1-[4,4-di-(4-fluoro-phenyl)-butyl]-piperazine, 4.7 parts of N-(2-chloro-acetyl)-2-acetyl-aniline, 3.2 parts of sodium carbonate, a few crystals of potassium iodide in 200 parts of 4-methyl-2-pentanone is stirred and refluxed for 65 hours. After cooling there is added 50 parts of water. The organic layer is separated, dried over potassium carbonate, filtered and evaporated. The oily residue is dissolved in 560 parts of ether. This solution is dried over potassium carbonate, filtered over Hyflo and gaseous hydrogen chloride is introduced into the filtrate. The precipitated solid is filtered off and recrystallized twice: first from a mixture of 2-propanol and methanol and then from methanol, yielding 1 - [4,4 - di - (4 - fluoro - phenyl) - butyl] - 4 - [(2-acetyl - anilino - carbonyl) - methyl] - piperazine dihydrochloride; M.P. 192–194° C.

*Example LXXVIII*

To a cooled (10° C.: ice-bath) mixture of 105 parts of acetic acid and 18 parts of 2-propionyl-aniline is added dropwise 17 parts of chloro-acetylchloride (exothermic reaction). After the addition is complete, the whole is stirred for 15 minutes at 10° C. Then there is added dropwise 132 parts of a sodium acetate/water solution (previously prepared starting from 51 parts of sodium acetate and 128 parts of water). After the addition is complete, the precipitated product is filtered off, washed with water and dried, yielding N-(2-chloro-acetyl)-2-propionyl-aniline; M.P. 76.5–77.5° C.

A mixture of 6.5 parts of 1-[4,4-di-(4-fluoro-phenyl)-butyl]-piperazine, 4.9 parts of N-(2-chloro-acetyl)-2-propionyl-aniline, 6.36 parts of sodium carbonate, a few crystals of potassium iodide in 200 parts of 4-methyl-2-pentanone is stirred and refluxed for 2 days. After cooling there is added 250 parts of water. The organic layer is separated, dried over potassium carbonate, filtered and evaporated. The oily residue is dissolved in diisopropylether and gaseous hydrogen chloride is introduced into the solution. The precipitated solid is filtered off and recrystallized from a mixture of methanol and anhydrous ether, to yield 1-[4,4-di-(4-fluoro-phenyl)-butyl]-4-[(2-propionyl-anilino-carbonyl)-methyl]-piperazine dihydrochloride; M.P. 162–176° C.

*Example LXXIX*

To 150 parts of acetic acid (previously cooled to 10° C.) is added portionwise 29.5 parts of 3-propionyl-aniline, followed by dropwise addition of 25.3 parts of chloroacetylchloride at 10° C. While maintaining this temperature, the whole is stirred for 30 minutes. Then there is added 198 parts of a sodium acetate solution (previously prepared from 103 parts sodium acetate in 256 parts of water). After this addition is complete, a solid is precipitated. It is filtered off, washed with water, dried and then dissolved in chloroform. The latter solution is dried, filtered and evaporated in vacuo. The residue is dried overnight in vacuo at 30° C., yielding N-(chloroacetyl)-3-propionyl-aniline; M.P. 69.5–70.5° C.

A mixture of 6.5 parts of 1-[4,4-di-(4-fluoro-phenyl)-butyl]-piperazine, 4.9 parts of N-(chloro-acetyl)-3-propionyl-aniline, 6.36 parts of sodium carbonate, a few crystals of potassium iodide in 200 parts of 4-methyl-2-pentanone is stirred and refluxed for 2 days. After cooling there is added 250 parts of water. The organic layer is separated, dried, filtered and evaporated. The oily residue is dissolved in anhydrous ether and gaseous hydrogen chloride is introduced into the filtrate. The precipitated product is filtered off and recrystallized from a mixture of methanol and 2-propanol, yielding 1-[4,4-di-(4-fluoro-phenyl)-butyl] - 4 - [(3 - propionyl-anilino-carbonyl)-methyl]-piperazine dihydrochloride; M.P. 225.5–227° C.

*Example LXXX*

A mixture of 6.2 parts dl-1-[4-phenyl-4-(4-fluoro-phenyl)-butyl]-piperazine, 4.4 parts N-(2-chloro-acetyl)-3,4-dimethyl-aniline, 3.18 parts sodium carbonate, a few crystals of potassium iodide in 200 parts 4-methyl-2-pentanone in 200 parts 4-methyl-2-pentanone is stirred and refluxed for 70 hours. After cooling there are added 100 parts water. The organic layer is separated, dried over potassium carbonate, filtered and evaporated. The oily residue is dissolved in 560 parts ether. The solution is filtered and gaseous hydrogen chloride is introduced into the filtrate. The precipitated salt is filtered off and recrystallized from a mixture of 160 parts methanol and 80 parts ether, yielding dl - 1 - [4 - phenyl - 4 - (4-fluoro-phenyl) - butyl] - 4 - [(3,4 - dimethyl - anilino - carbonyl) - methyl] - piperazine dihydrochloride; M.P. 234.5–236° C.

*Example LXXXI*

A mixture of 6.2 parts dl-1-[4-phenyl-4-(4-fluoro-phenyl)-butyl]-piperazine, 4.4 parts N-(2-chloro-acetyl)-2,4-dimethyl-aniline, 3.18 parts sodium carbonate, a few crystals of potassium iodide in 200 parts 4-methyl-2- pentanone is stirred and refluxed for 48 hours. After cooling there are added 100 parts water. The organic layer is separated, dried over potassium carbonate, filtered and evaporated. The oily residue is dissolved in ether. The solution is filtered and gaseous hydrogen chloride is introduced into the filtrate. The precipitated salt is filtered off and recrystallized from a mixture of 240 parts 2-propanol and 240 parts methanol, yielding dl-1-[4-phenyl-4-(4 - fluoro - phenyl) - butyl] - 4 - [(2,4 - dimethyl - anilino-carbonyl)-methyl]-piperazine dihydrochloride; M.P. 226–237° C. (dec.).

*Example LXXXII*

A mixture of 6.9 parts 1-[4,4-di-(4-fluoro-phenyl)-butyl]-piperazine, 4.4 parts N-(2-chloro-acetyl)-2,4-dimethyl-aniline, 3.18 parts sodium carbonate, a few crystals of potassium iodide in 200 parts 4-methyl-2-pentanone is stirred and refluxed for 70 hours. After cooling there are added 100 parts water. The organic layer is separated, dried over potassium carbonate, filtered and evaporated. The oily residue is dissolved in a mixture of 400 parts ether and 8 parts acetone. The solution is filtered and gaseous hydrogen chloride is introduced into the filtrate. The precipitated salt is filtered off and recrystallized from 240 parts 2-propanol, yielding 1-[4,4-di - (4 - fluoro - phenyl) - butyl] - 4 - [(2,4 - dimethylanilino - carbonyl) - methyl]-piperazine dihydrochloride; M.P. 236–239.5° C.

*Example LXXXIII*

A mixture of 6.3 parts dl-1-[4-phenyl-4-(4-fluoro-phenyl)-butyl]-piperazine, 4.7 parts N-(3-chloro-propionyl)-2,6-dimethyl-aniline, 3.18 parts sodium carbonate, a few crystals of potassium iodide in 200 parts 4-methyl-2-pentanone is stirred and refluxed for 48 hours. After cooling there are added 100 parts water. The organic layer is separated, dried over potassium carbonate, filtered and evaporated. The oily residue is dissolved in ether. This solution is filtered and gaseous hydrogen chloride is introduced into the filtrate. The precipitated salt is filtered off and recrystallized from a mixture of 160 parts 2-propanol and 40 parts methanol, yielding dl - 1 - [4 - phenyl - 4 - (4 - fluoro - phenyl) - butyl] - 4 - [2-(2,6-dimethyl-anilino-carbonyl)-ethyl] - piperazine dihydrochloride; M.P. 216–217° C.

Example LXXXIV

A mixture of 6.9 parts 1-[4,4-di-(4-fluoro-phenyl)-butyl]-piperazine, 4.4 parts N-(2-chloro-acetyl)-3,4-dimethyl-aniline, 3.18 parts sodium carbonate, a few crystals of potassium iodide in 200 parts 4-methyl-2-pentanone is stirred and refluxed for 70 hours. After cooling there are added 100 parts water. The organic layer is separated, dried over potassium carbonate, filtered and evaporated. The oily residue is dissolved in 560 parts ether. This solution is filtered and gaseous hydrogen chloride is introduced into the filtrate. The precipitated salt is filtered off and recrystallized from a mixture of 240 parts 2-propanol and 160 parts methanol, yielding 1 - [4,4 - di - (4 - fluoro - phenyl) - butyl] - 4 - [(3,4 - dimethyl - anilino - carbonyl) - methyl] - piperazine dihydrochloride; M.P. 234–239° C.

Example LXXXV

A mixture of 4.9 parts of 1-[4,4-di-(4-fluoro-phenyl)-butyl]-piperazine, 5.9 parts N-(2-chloro-acetyl)-2,6-dibromo-aniline, 3.2 parts sodium carbonate, a few crystals of potassium iodide in 200 parts 4-methyl-2-pentanone is stirred and refluxed for 48 hours. After cooling there are added 50 parts water. The organic layer is separated, dried over potassium carbonate, filtered and evaporated. The oily residue is dissolved in 400 parts diisopropylether. The solution is filtered and gaseous hydrogen chloride is introduced into the filtrate. The precipitated salt is filtered off and recrystallized from a mixture of 160 parts methanol and 160 parts 2-propanol, yielding 1-[4,4-di-(4 - fluoro - phenyl) - butyl] - 4 - [(2,6 - dibromo-anilino - carbonyl) - methyl] - piperazine dihydrochloride; M.P. 252–255° C. (dec.).

Example LXXXVI

A mixture of 4.5 parts dl-1-[4-phenyl-4-(4-fluorophenyl)-butyl]-piperazine, 5.9 parts N-(2-chloro-acetyl)-2,6-dibromo-aniline, 3.18 parts sodium carbonate, a few crystals of potassium iodide in 200 parts 4-methyl-2-pentanone is stirred and refluxed for 50 hours. After cooling there are added 100 parts water. The organic layer is separated, dried over potassium carbonate, filtered and evaporated. The oily residue is dissolved in 640 parts ether. The solution is filtered and gaseous hydrogen chloride is introduced into the filtrate. The precipitated salt is filtered off and recrystallized from a mixture of 160 parts 2-propanol and 320 parts methanol, yielding dl - 1 - [4-phenyl - 4 - (4-fluoro-phenyl)-butyl]-4-[2,6 - dibromo - anilino - carbonyl) - methyl] - piperazine dihydrochloride; M.P. 241–244.5° C.

Example LXXXVII

A mixture of 4 parts 1-(4,4-diphenyl-butyl)-piperazine, 4.6 parts N-(2-chloro-acetyl)-2,6-dimethoxy-aniline, 3.2 parts sodium carbonate, a few crystals of potassium iodide in 200 parts 4-methyl-2-pentanone is stirred and refluxed for 48 hours. After cooling there are added 50 parts water. The organic layer is separated, dried over potassium carbonate, filtered and evaporated. The oily residue is dissolved in 480 parts ether. The solution is filtered and gaseous hydrogen chloride is introduced into the filtrate: an oily precipitate is formed. The solvent is decanted and from the oily salt the free base is liberated in the usual manner. After extraction with ether, the solution is dried over potassium carbonate, filtered and evaporated. The solid residue is recrystallized from a mixture of 80 parts diisopropylether and 20 parts acetone, to yield 1-(4,4-diphenyl-butyl)-4-[2,6-dimethoxy-anilino-carbonyl)-methyl]-piperazine; M.P. 115–117° C.

Example LXXXVIII

A mixture of 6.6 parts 1-[4,4-di-(4-fluoro-phenyl)-butyl]-piperazine, 4.7 parts N-(3-chloro-propionyl)-2,6-dimethyl-aniline, 3.2 parts sodium carbonate, a few crystals of potassium iodide in 200 parts 4-methyl-2-pentanone is stirred and refluxed for 40 hours. After cooling there are added 50 parts water. The organic layer is separated, dried over potassium carbonate, filtered and evaporated. The oily residue is dissolved in 560 parts ether. The solution is filtered and gaseous hydrogen chloride is introduced into the filtrate. The precipitated salt is filtered off and recrystallized from a mixture of 120 parts methanol and 120 parts 2-propanol, yielding 7.1 parts crude 1 - [4,4 - di - (4 - fluoro-phenyl) - butyl] - 4 - [2-(2,6 - dimethyl - anilino - carbonyl) - ethyl] - piperazine dihydrochloride. This fraction is dissolved in 56 parts methanol. The solution is filtered and to the filtrate is added anhydrous ether until a turbid solution is obtained. After keeping for a few hours at room temperature, the precipitated product is filtered off and dried, yielding 1-[4,4 - di - (4 - fluoro - phenyl) - butyl] - 4 - [2 - (2,6-dimethyl - anilino - carbonyl) - ethyl] - piperazine dihydrochloride; M.P. 220–221° C.

Example LXXXIX

A mixture of 4.3 parts dl-1-[4-phenyl-4-(4-fluorophenyl)-butyl]-piperazine, 4.6 parts N-(2-chloro-acetyl)-2,6-dimethoxy-aniline, 3.18 parts sodium carbonate, a few crystals of potassium iodide in 200 parts 4-methyl-2-pentanone is stirred and refluxed for 50 hours. After cooling there are added 100 parts water. The organic layer is separated, dried over potassium carbonate, filtered and evaporated. The oily residue is dissolved in 100 parts boiling 2-propanol. The solution is filtered hot and to the warm filtrate is added a hot solution of 2.2 parts oxalic acid dihydrate in 16 parts 2-propanol. After cooling to room temperature, the precipitated oxalate is filtered off and recrystallized three times from methanol, yielding dl - 1 - [4-phenyl - 4 - (4-fluoro-phenyl)-butyl]-4 - [(2,6 - dimethoxy - anilino - carbonyl) - methyl]-piperazine dioxalate; M.P. 197.5–198.5° C.

Example XC

A mixture of 6.6 parts 1-[4,4-di-(4-fluoro-phenyl)-butyl]-piperazine, 4.8 parts N-(2-chloro-acetyl)-2-chloro-6-methyl-aniline, 3.18 parts sodium carbonate, a few crystals of potassium iodide in 200 parts 4-methyl-2-pentanone is stirred and refluxed for 50 hours. After cooling there are added 100 parts water. The organic layer is separated, dried over potassium carbonate, filtered and evaporated. The oily residue is dissolved in 560 parts diethyl ether. The precipitated hydrochloride is filtered off and recrystallized from a mixture of 160 parts 2-propanol and 320 parts methanol, yielding 1-[4,4-di-(4 - fluoro - phenyl) - butyl] - 4 - [(2 - chloro - 6 - methyl-anilino - carbonyl) - methyl] - piperazine dihydrochloride; M.P. 229–234° C.

Example XCI

A mixture of 6.3 parts dl-1-[4-phenyl-4-(4-fluorophenyl)-butyl]-piperazine, 4.8 parts N-(2-chloro-acetyl)-2-chloro-6-methyl-aniline, 3.18 parts sodium carbonate, a few crystals of potassium iodide in 200 parts 4-methyl-2-pentanone is stirred and refluxed for 50 hours. After cooling there are added 100 parts water. The organic layer is separated, dried over potassium carbonate, filtered and evaporated. The oily residue is dissolved in 560 parts ether. The solution is filtered and gaseous hydrogen chloride is introduced into the filtrate. The precipitated salt is filtered off and recrystallized from a mixture of 160 parts 2-propanol and 240 parts methanol, yielding dl - 1 - [4 - phenyl - 4 - (4 - fluoro - phenyl) - butyl]-4-[(2 - chloro - 6 - methyl - anilino - carbonyl) - methyl]-piperazine dihydrochloride; M.P. 219–226° C.

*Example XCII*

A mixture of 6 parts 1-(4,4-diphenyl-butyl)-piperazine, 4.8 parts N - (2-chloro-acetyl)-2-chloro-6-methyl-aniline, 3.18 parts sodium carbonate, a few crystals of potassium iodide in 200 parts 4-methyl-2-pentanone is stirred and refluxed for 50 hours. After cooling there are added 100 parts water. The organic layer is separated, dried over potassium carbonate, filtered and evaporated. The oily residue is dissolved in ether. This solution is filtered and gaseous hydrogen chloride is introduced into the filtrate. The precipitated salt is filtered off and dissolved in a mixture of 280 parts 2-propanol and 280 parts methanol. The solution is filtered while hot and after cooling the filtrate to 0° C., the precipitated solid is filtered off and dried, yielding 1 - (4,4 - diphenyl - butyl) - 4 - [(2-chloro-6-methyl-anilino-carbonyl) - methyl] - piperazine dihydrochloride; M.P. 223–227.5° C.

*Example XCIII*

A mixture of 4.3 parts 1-[4,4-di-(4-fluoro-phenyl)-butyl]-piperazine, 3.4 parts N-(2-chloro-acetyl)-2,6-dimethoxy-aniline, 2.6 parts sodium carbonate, a few crystals of potassium iodide in 200 parts 4-methyl-2-pentanone is stirred and refluxed for 50 hours. After cooling there are added 100 parts water. The organic layer is separated, dried over potassium carbonate, filtered and evaporated. The oily residue is dissolved in 80 parts boiling 2-propanol. This solution is filtered hot and to the warm filtrate is added a hot solution of 1.7 parts oxalic acid dihydrate in 80 parts 2-propanol. After cooling to room temperature, the precipitated salt is filtered off and recrystallized from 160 parts methanol, yielding 1-[4,4-di-(4 - fluoro - phenyl) - butyl] - 4 - [(2,6-dimethoxy-anilino-carbonyl) - methyl] - piperazine dioxalate; M.P. 199–199.5° C.

What is claimed is:

1. A compound selected from the group consisting of

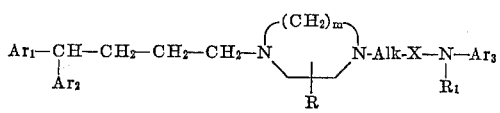

and the therapeutically active non-toxic acid addition salts thereof, wherein $Ar_1$ and $Ar_2$ are each selected from the group consisting of phenyl, lower alkylphenyl, halophenyl, trifluoromethylphenyl and thienyl; $m$ is an integer from 2 to 3; Alk is a member selected from the group consisting of —CH(CH$_3$)— and —(CH$_2$)$_n$— in which $n$ is an integer from 1 to 3; X is a member selected from the group consisting of carbonyl and methylene; R is a member selected from the group consisting of hydrogen and methyl; $R_1$ is a member selected from the group consisting of hydrogen, lower alkyl and lower alkyl carbonyl; and $Ar_3$ is a member selected from the group consisting of (a) 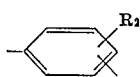

(b) 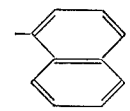

and (c) 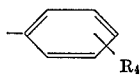

in which $R_2$ and $R_3$ are each selected from the group consisting of hydrogen, lower alkyl, lower alkoxy, halo and nitro, and $R_4$ is lower alkyl carbonyl.

2. A compound of the formula

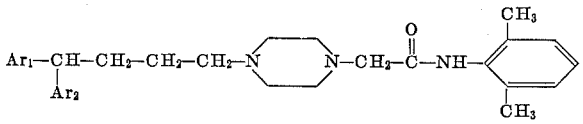

wherein $Ar_1$ and $Ar_2$ are selected from the group consisting of phenyl, lower alkylphenyl, halophenyl, trifluoromethylphenyl and thienyl.

3. 1 - [4,4 - di - (halophenyl)-butyl]-4-[(2,6-dimethyl-anilino-carbonyl)-methyl]-piperazine.

4. 1 - [4,4 - di-(4-fluoro-phenyl)-butyl]-4-[(2,6-dimethyl-anilino-carbonyl)-methyl]-piperazine.

5. dl - 1 - [4-phenyl-4-(4-fluoro-phenyl)-butyl]-4-[(2,6-dimethyl-anilino-carbonyl)-methyl]-piperazine.

6. 1 - (4,4 - diphenyl - butyl)-4-[(2,6-dimethyl-anilino-carbonyl)-methyl]-piperazine dihydrochloride.

7. A compound of the formula

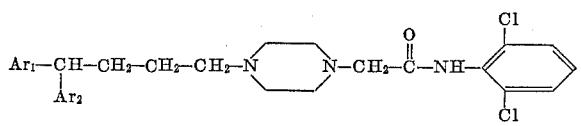

wherein $Ar_1$ and $Ar_2$ are selected from the group consisting of phenyl, lower alkylphenyl, halophenyl, trifluoromethylphenyl and thienyl.

8. 1 - [4,4 - di - (halophenyl)-butyl]-4-[(2,6-dichloro-anilino-carbonyl)-methyl]-piperazine.

9. 1 - [4,4-di-(4-fluoro-phenyl)-butyl]-4-[(2,6-dichloro-anilino-carbonyl)-methyl]-piperazine dihydrochloride.

10. dl - 1 - [4-phenyl-4-(4-fluoro-phenyl)-butyl]-4-[(2,6-dichloro-anilino-carbonyl)-methyl]-piperazine dihydrochloride.

11. A compound of the general formula

wherein $Ar_1$ and $Ar_2$ are selected from the group consisting of phenyl, lower alkylphenyl, halophenyl, trifluoromethylphenyl and thienyl.

12. 1 - [4,4-di-(halophenyl)-butyl]-4-(2-anilino-ethyl)-piperazine.

13. 1 - [4,4 - di - (4-fluoro-phenyl)-butyl]-4-(2-anilino-ethyl)-piperazine trihydrochloride.

14. A compound of the general formula

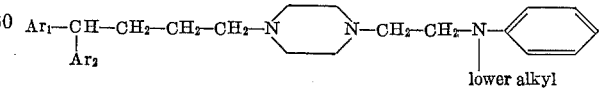

wherein $Ar_1$ and $Ar_2$ are selected from the group consisting of phenyl, lower alkylphenyl, halophenyl, trifluoromethylphenyl and thienyl.

15. 1 - [4,4 - di-(4-fluoro-phenyl)-butyl]-4-[2-(N-lower alkyl-anilino)-ethyl]-piperazine.

16. 1 - [4,4 - di-(4-fluoro-phenyl)-butyl]-4-[2-(N-ethyl-anilino)-ethyl]-piperazine trihydrochloride.

No references cited.

HENRY R. JILES, *Acting Primary Examiner.*

J. W. ADAMS, *Assistant Examiner.*